US006419986B1

(12) United States Patent
Holtermann et al.

(10) Patent No.: US 6,419,986 B1
(45) Date of Patent: *Jul. 16, 2002

(54) METHOD FOR REMOVING REACTIVE METAL FROM A REACTOR SYSTEM

(75) Inventors: Dennis L. Holtermann, Crockett; Hong Chiu Chen, San Rafael; Richard M Wolpert, Berkeley; Charles R. Wilson, San Francisco; Daniel P. Hagewiesche, Oakland, all of CA (US)

(73) Assignee: Chevron Phillips Chemical Company IP, Houston, TX (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/781,434

(22) Filed: Jan. 10, 1997

(51) Int. Cl.[7] ............................................. C23C 16/06
(52) U.S. Cl. ................... 427/250; 427/253; 427/383.7; 208/47; 208/49; 208/52 CT; 502/35; 502/516
(58) Field of Search ................................ 427/250, 253, 427/383.7; 204/192.31; 208/133, 46, 47, 49, 52 CT, 140; 502/35, 516

(56) References Cited

U.S. PATENT DOCUMENTS

| | | | |
|---|---|---|---|
| 1,802,695 A | 4/1931 | Bennett |
| 1,883,630 A | 10/1932 | Duff |
| 2,063,596 A | 12/1936 | Feiler |
| 2,263,366 A | 11/1941 | Peck et al. |
| 2,685,543 A | 8/1954 | Sindeband |
| 2,818,374 A | 12/1957 | Certa et al. |
| 2,929,775 A | 3/1960 | Aristoff et al. |
| 3,108,013 A | 10/1963 | Chao et al. |
| 3,160,671 A | 12/1964 | Feigelman |
| 3,169,000 A | 2/1965 | Earnst et al. |
| 3,178,321 A | 4/1965 | Satterfield |
| 3,216,789 A | 11/1965 | Breck et al. |
| 3,284,526 A | 11/1966 | Frayer |
| 3,415,737 A | 12/1968 | Kluksdahl |
| 3,459,821 A | 8/1969 | Engelbrecht |

(List continued on next page.)

FOREIGN PATENT DOCUMENTS

| | | |
|---|---|---|
| CH | 556 396 A | 11/1974 |
| DE | 1521848 | 4/1969 |
| EP | 0 082 920 | 7/1983 |
| EP | 0 146 081 | 6/1985 |
| EP | 0 192 059 | 8/1986 |
| EP | 201 856 | 11/1986 |
| EP | 0 241 020 | 10/1987 |
| EP | 0 320 549 | 6/1989 |
| EP | 0 351 067 | 1/1990 |
| EP | 498182 | 8/1992 |
| EP | 0 403 976 | 12/1996 |
| FR | 2 500 468 | 8/1982 |
| GB | 313303 | 6/1929 |
| GB | 317303 | 8/1929 |
| GB | 1054121 | 1/1967 |

(List continued on next page.)

OTHER PUBLICATIONS

Audisio, Chemical Vapor Deposition of Tin on Iron or Carburized Iron, pp. 2299–2304, Oct. 1980, J. Electrochem. Soc.: Solid–State Science and Technology.
Prange, 1959, "Corrison in a Hydrocarbon Conversion System" Corrison, 15(12):619t–621t.*
Alon Processing, Inc., "Alonized steels for temperature corrosion resistance," 1990, pp. 1–19.
Berg et al., "Catayltic LPG Dehydrogenation Fits in '80's Outlook", *Oil and Gas Journal* pp. 191–197, Nov. 1980.
Bernard, "Hydrocarbons Aromatization on Platinum Alkaline Zeolites", Proceedings of the Fifth Int. Conf. Zeolites. pp. 686–695, Heydon, London (1980).
Besoukhanova et al., "The Sulfur Poisoning of Pt Alkaline L Zeolites," *Catalyst Deactivation*, pp. 201–211 Delmon and Froment, eds., Elsevier Scientific Publishing Company, Amsterdam.
Buss et al., "New Developments in Rheniforming," *NPRA Annual Meeting*, Mar. 19–21, 1978, San Antonio, Texas, presentation AM–78–51 no page numbers.
Chatterjee et al., Mar. 1978, "Effect of electrodeposited metals on the permeation of hydrogen through iron membranes," *Metallurgical Transactions 9A* :389–395.
Chen et al., "The use of zinc and tin coatings and chemical additives for preventing hydrogen embrittlement in steel," *Corrosion Prevention & Control*, pp. 71–74.
Cooper, "Hydrogen Attack," In: *Hydrocarbon Processing*, pp. 69–70, Aug. 1972.
"Corrosion and Corrosion Inhibitors", Kirk Othmer Encyclopedia, 3rd Ed., 1979, pp. 113–142.
Database WPI, Section ch, Week 8750, Derwent Publications, Ltd., Londong, GB; JP application number 87–352730, Publication number JP–A–62 256 946, Nov. 9, 1987.

(List continued on next page.)

Primary Examiner—Timothy Meeks
Assistant Examiner—Bret Chen
(74) Attorney, Agent, or Firm—Pennie & Edmonds LLP (57) ABSTRACT

A method of removing reactive metal from a metal-coated reactor system, comprising contacting at least a portion of a metal-coated reactor system containing reactive metal with a getter to produce movable metal, and fixating the movable metal, the getter, or both. The contacting is preferably done prior to catalyst loading. A preferred coating metal comprises tin and a preferred getter comprises HCl. The invention is also a method for reducing catalyst contamination from a metal which was used to coat a reactor system. The method comprises contacting a metal-coated reactor system, with a gaseous halogen-containing compound to produce movable metal; thereafter or simultaneously, at least a portion of the movable metal is removed from the reactor system. Then a halided catalyst is loaded into the reactor system.

40 Claims, 3 Drawing Sheets

U.S. PATENT DOCUMENTS

| | | |
|---|---|---|
| 3,505,028 A | 4/1970 | Douthit |
| 3,507,781 A | 4/1970 | Spurlock et al. |
| 3,531,394 A | 9/1970 | Kuszman |
| 3,531,543 A | 9/1970 | Clippinger et al. |
| 3,536,776 A | 10/1970 | Lo |
| 3,554,902 A | 1/1971 | Buss |
| 3,584,060 A | 6/1971 | Rausch |
| 3,607,960 A | 9/1971 | Button |
| 3,615,357 A * | 10/1971 | Wainer ......................... 75/64 |
| 3,617,359 A | 11/1971 | Wakefield |
| 3,623,901 A | 11/1971 | Forstmann et al. |
| 3,631,215 A | 12/1971 | Clippinger et al. |
| 3,634,147 A | 1/1972 | Helwig |
| 3,650,944 A | 3/1972 | McCoy et al. |
| 3,686,340 A | 8/1972 | Patrick et al. |
| 3,700,745 A | 10/1972 | Kovach et al. |
| 3,708,550 A | 1/1973 | Beuther et al. |
| 3,718,578 A | 2/1973 | Buss et al. |
| 3,732,123 A | 5/1973 | Stolfa et al. |
| 3,743,551 A | 7/1973 | Sanderson |
| 3,767,456 A | 10/1973 | Glaski |
| 3,783,123 A | 1/1974 | Young |
| 3,785,847 A | 1/1974 | Wisniewski |
| 3,827,967 A | 8/1974 | Nap et al. |
| 3,833,358 A | 9/1974 | Bellot et al. |
| 3,835,183 A | 9/1974 | Carpenter et al. |
| 3,864,284 A | 2/1975 | Clippinger et al. |
| 3,867,512 A | 2/1975 | Young |
| 3,878,131 A | 4/1975 | Hayes |
| 3,884,797 A | 5/1975 | Alley, Jr. et al. |
| 3,890,110 A | 6/1975 | Glaski |
| 3,890,686 A | 6/1975 | Caubert |
| 3,898,153 A | 8/1975 | Louder et al. |
| 3,907,916 A | 9/1975 | Soderquist et al. |
| 3,919,073 A | 11/1975 | Bagnoli et al. |
| 3,944,396 A | 3/1976 | Chivinsky |
| 3,955,935 A | 5/1976 | Schockley et al. |
| 3,966,833 A | 6/1976 | Cosyns et al. |
| 4,012,313 A | 3/1977 | Buss et al. |
| 4,013,487 A | 3/1977 | Ramqvist et al. |
| 4,015,950 A | 4/1977 | Galland et al. |
| 4,017,336 A | 4/1977 | Foroulis |
| 4,019,969 A | 4/1977 | Golebiowski et al. |
| 4,033,898 A * | 7/1977 | Jacobson et al. ............ 208/140 |
| 4,048,057 A * | 9/1977 | Murphy ...................... 208/89 |
| 4,058,452 A | 11/1977 | Loboda |
| 4,104,320 A | 8/1978 | Bernard et al. |
| 4,111,763 A | 9/1978 | Pryer |
| 4,132,743 A | 1/1979 | Castor et al. |
| 4,155,836 A | 5/1979 | Collins et al. |
| 4,161,510 A | 7/1979 | Edridge |
| 4,163,706 A | 8/1979 | Horowitz et al. |
| 4,163,708 A | 8/1979 | Jacobson et al. |
| 4,167,532 A | 9/1979 | Walker et al. |
| 4,167,533 A | 9/1979 | Raymond |
| 4,173,457 A | 11/1979 | Smith |
| 4,179,361 A | 12/1979 | Michlmayr |
| 4,180,455 A | 12/1979 | Taciuk |
| 4,189,613 A | 2/1980 | Bjornson |
| 4,191,632 A | 3/1980 | Cosyns et al. |
| 4,191,846 A | 3/1980 | Farha, Jr. et al. |
| 4,204,997 A | 5/1980 | Hobbs et al. |
| 4,208,302 A | 6/1980 | McKay |
| 4,215,231 A | 7/1980 | Raymond |
| 4,220,560 A | 9/1980 | Anquetil et al. |
| 4,225,417 A | 9/1980 | Nelson |
| 4,229,603 A | 10/1980 | Lyon |
| 4,264,433 A | 4/1981 | McKay |
| 4,268,188 A | 5/1981 | Bertus et al. |
| 4,271,008 A | 6/1981 | Vogt et al. |
| 4,297,150 A | 10/1981 | Foster et al. |
| 4,324,648 A * | 4/1982 | Roberts et al. ............. 208/114 |
| 4,325,994 A | 4/1982 | Kitashima et al. |
| 4,329,173 A | 5/1982 | Culling |
| 4,343,658 A | 8/1982 | Baker et al. |
| 4,347,396 A | 8/1982 | Takano et al. |
| 4,348,271 A | 9/1982 | Swan |
| 4,350,719 A | 9/1982 | Baldi |
| 4,368,172 A | 1/1983 | Takahashi et al. |
| 4,377,495 A | 3/1983 | Tse |
| 4,385,645 A | 5/1983 | Campbell et al. |
| 4,404,087 A | 9/1983 | Reed et al. |
| 4,410,418 A | 10/1983 | Kukes et al. |
| 4,416,806 A | 11/1983 | Bernard et al. |
| 4,438,288 A | 3/1984 | Imai |
| 4,444,732 A | 4/1984 | Konoki et al. |
| 4,447,316 A | 5/1984 | Buss |
| 4,451,687 A | 5/1984 | Daly et al. |
| 4,456,527 A | 6/1984 | Buss et al. |
| 4,463,206 A | 7/1984 | Derrien et al. |
| 4,467,016 A | 8/1984 | Baldi |
| 4,471,151 A | 9/1984 | Kolts |
| 4,481,264 A | 11/1984 | Faure |
| 4,482,637 A * | 11/1984 | Buss et al. .................. 208/140 |
| 4,488,578 A | 12/1984 | Tseung et al. |
| 4,500,364 A | 2/1985 | Krutenat |
| 4,507,196 A | 3/1985 | Reed et al. |
| 4,507,397 A | 3/1985 | Buss |
| 4,511,405 A | 4/1985 | Reed et al. |
| 4,529,626 A | 7/1985 | Baker et al. |
| 4,536,455 A | 8/1985 | Maeda et al. |
| 4,545,893 A | 10/1985 | Porter et al. |
| 4,551,227 A | 11/1985 | Porter et al. |
| 4,552,643 A | 11/1985 | Porter et al. |
| 4,555,326 A | 11/1985 | Reid |
| 4,595,673 A | 6/1986 | Imai et al. |
| 4,610,972 A * | 9/1986 | Hughes ...................... 208/140 |
| 4,613,372 A | 9/1986 | Porter et al. |
| 4,613,715 A | 9/1986 | Haskell |
| 4,634,518 A | 1/1987 | Buss et al. |
| 4,665,267 A | 5/1987 | Barri |
| 4,666,583 A | 5/1987 | Porter et al. |
| 4,666,589 A | 5/1987 | Klein et al. |
| 4,681,865 A | 7/1987 | Katsuno et al. |
| 4,685,427 A | 8/1987 | Tassen et al. |
| 4,686,201 A | 8/1987 | Porter et al. |
| 4,687,567 A | 8/1987 | Porter et al. |
| 4,692,234 A | 9/1987 | Porter et al. |
| 4,692,313 A | 9/1987 | Watanabe et al. |
| 4,716,143 A | 12/1987 | Imai |
| 4,717,700 A | 1/1988 | Venkstram et al. |
| 4,727,216 A | 2/1988 | Miller |
| 4,741,819 A | 5/1988 | Robinson et al. |
| 4,743,318 A | 5/1988 | Fischer et al. |
| 4,761,512 A | 8/1988 | Katsuno et al. |
| 4,762,681 A | 8/1988 | Tassen et al. |
| H544 H | 11/1988 | Castillo et al. |
| 4,786,625 A | 11/1988 | Imai et al. |
| 4,795,732 A | 1/1989 | Barri |
| 4,804,446 A | 2/1989 | Lashmore et al. |
| 4,804,487 A | 2/1989 | Reed et al. |
| 4,827,072 A | 5/1989 | Imai et al. |
| 4,830,732 A | 5/1989 | Mohr et al. |
| 4,861,458 A * | 8/1989 | Martin et al. ............... 208/113 |
| 4,863,892 A | 9/1989 | Porter et al. |
| 4,886,928 A | 12/1989 | Imai et al. |
| 4,902,849 A | 2/1990 | McKay et al. |
| 4,917,969 A | 4/1990 | Pircher et al. |
| 4,925,549 A | 5/1990 | Robinson et al. |
| 4,926,005 A | 5/1990 | Olbrich et al. |
| 4,935,566 A | 6/1990 | Dessau et al. |

| | | |
|---|---|---|
| 4,940,532 A | 7/1990 | Peer et al. |
| 4,940,828 A | 7/1990 | Peterson et al. |
| 4,954,245 A | 9/1990 | Miller et al. |
| 4,975,178 A | 12/1990 | Clem et al. |
| 4,976,932 A | 12/1990 | Maeda et al. |
| 4,982,047 A | 1/1991 | Barri et al. |
| 5,009,963 A | 4/1991 | Ohmi et al. |
| 5,012,027 A | 4/1991 | Abrevaya et al. |
| 5,015,358 A | 5/1991 | Reed et al. |
| 5,035,792 A * | 7/1991 | Foutsitzis et al. ............ 208/138 |
| 5,041,208 A * | 8/1991 | Patridge et al. ............. 208/217 |
| 5,053,572 A | 10/1991 | Kim et al. |
| 5,053,574 A | 10/1991 | Tsutsui et al. |
| 5,073,652 A | 12/1991 | Katsuno et al. |
| 5,091,351 A | 2/1992 | Murakawa et al. |
| 5,107,061 A | 4/1992 | Ou et al. |
| 5,110,854 A | 5/1992 | Ratliff |
| 5,118,028 A | 6/1992 | Ogawa et al. |
| 5,128,300 A | 7/1992 | Chao et al. |
| 5,139,814 A | 8/1992 | Sugano |
| 5,139,914 A | 8/1992 | Tomiyama et al. |
| 5,196,631 A | 3/1993 | Murakawa et al. |
| 5,196,632 A | 3/1993 | Larsen et al. |
| 5,208,069 A | 5/1993 | Clark et al. |
| 5,238,492 A | 8/1993 | Itoh et al. |
| 5,242,665 A | 9/1993 | Maeda et al. |
| 5,260,238 A | 11/1993 | Murakawa et al. |
| 5,275,645 A | 1/1994 | Ternoir et al. |
| 5,279,998 A * | 1/1994 | Mulaskey et al. ............ 502/74 |
| 5,298,091 A | 3/1994 | Edwards, III et al. |
| 5,322,615 A | 6/1994 | Holtermann et al. |
| 5,366,585 A * | 11/1994 | Robertson et al. ............ 216/67 |
| 5,376,464 A | 12/1994 | Dupoiron et al. |
| 5,397,652 A * | 3/1995 | Carey, II et al. ............ 428/610 |
| 5,401,894 A | 3/1995 | Brasier et al. |
| 5,405,525 A | 4/1995 | Heyse et al. |
| 5,406,014 A | 4/1995 | Heyse et al. |
| 5,413,671 A * | 5/1995 | Ketchum ..................... 216/37 |
| 5,413,700 A | 5/1995 | Heyse et al. |
| 5,472,593 A | 12/1995 | Gosling et al. |
| 5,516,421 A * | 5/1996 | Brown et al. ............... 208/140 |
| 5,575,902 A | 11/1996 | Heyse et al. |
| 5,593,571 A | 1/1997 | Heyse et al. |
| 5,614,454 A | 3/1997 | Galperin et al. |
| 5,647,953 A * | 7/1997 | Williams et al. .............. 216/67 |
| 5,648,178 A | 7/1997 | Heyse et al. |
| 5,658,452 A * | 8/1997 | Heyse et al. .................. 208/47 |
| 5,674,376 A | 10/1997 | Heyse et al. |
| 5,676,821 A | 10/1997 | Heyse et al. |
| 5,710,356 A | 1/1998 | Subramaniam et al. |
| 5,723,707 A | 3/1998 | Heyse et al. |
| 5,807,842 A * | 9/1998 | Buscemi et al. .............. 208/47 |
| 5,833,838 A | 11/1998 | Heyse et al. |
| 5,849,969 A | 12/1998 | Heyse et al. |
| 5,863,418 A | 1/1999 | Heyse et al. |
| 6,019,943 A | 2/2000 | Buscemi et al. |
| 6,139,909 A | 10/2000 | Hagewiesche |
| 6,164,295 A * | 12/2000 | Ui et al. ....................... 216/60 |

FOREIGN PATENT DOCUMENTS

| | | |
|---|---|---|
| GB | 1122017 | 7/1968 |
| GB | 1149163 | 4/1969 |
| GB | 1202511 | 8/1970 |
| GB | 1319265 | 6/1973 |
| GB | 1393365 | 5/1975 |
| GB | 1423889 | 2/1976 |
| GB | 1521848 | 8/1978 |
| GB | 2066696 | 7/1981 |
| GB | 1604604 | 12/1981 |
| GB | 2162082 | 1/1986 |
| GB | 2234530 | 2/1991 |
| JP | 56-41363 | 4/1981 |
| JP | 57-8287 | 1/1982 |
| JP | 57-105485 | 6/1982 |
| JP | 57-161056 | 10/1982 |
| JP | 57-181784 | 10/1982 |
| JP | 58-109589 | 6/1983 |
| JP | 58-198587 | 11/1983 |
| JP | 59-157494 | 9/1984 |
| JP | 59-193264 | 11/1984 |
| JP | 60-99193 | 6/1985 |
| JP | 62-132995 | 6/1987 |
| JP | 62-210047 | 9/1987 |
| JP | 63-65057 | 3/1988 |
| JP | 63-192567 | 8/1988 |
| JP | 64-18502 | 1/1989 |
| JP | 5-93239 | 4/1993 |
| JP | 5-93240 | 4/1993 |
| JP | 5-93248 | 4/1993 |
| WO | WO 92/15653 | 9/1992 |
| WO | WO 94/15896 | 7/1994 |
| WO | WO 94 15898 | 7/1994 |
| WO | WO 95/18849 | 7/1995 |
| WO | WO 96 05269 | 2/1996 |
| WO | WO 96/41904 | 12/1996 |

OTHER PUBLICATIONS

Duc et al., "Ferritic Transformation of an Austenitic Stainless Steel by Hot Dipping in Liquid Tin or Tin–Nickel Alloys," *Journal of Crystal Growth* 24/25:559–562.

Dunn, "HP in Construction", Hydrocarbon Processing; pp. 41–42, Aug. 1991. excerpts from the NPRA (National Petroleum Refiners Assoc.), Q & A, 1981 (Questions 17) pp. 90–94.

excerpts from the NPRA (National Petroleum Refiners Assoc.), Q & A, 1982 (Questions 22). pp. 95–96.

Fontana, "Eight forms of corrosion, "*In: Corrosion Engineering*, pp. 108–115.

Freiberger et al., "Recent Catalyst and Process Improvements in Commerical Rheinforming," 1980 *NPRA Annual Meeting* (1980). no page numbers.

Garverick, L., ed, "Corrosion in the Petrochemical Industry," *In: ASM International*, pp. 59–63 and pp. 330–332, Dec. 1994.

Greene, "High–Temperature Metal–Gas Reactions," *In Corrosion Engineering*, pp. 367–373 no date.

Gussow et al., "Dehydrogenation Links LPG to More Octanges", Oil and Gas Journal, pp. 96–101, Dec. 1980.

Guzeiti et al., "Corrosion in Petroleum Refining and Petrochemical Operations," Metals Handbook 9th Ed., 1987, pp. 1262–1266.

Hettinger et al., 1955, "Hydroforming Reactions: Effects of Certain Catalyst Properties and Poisons," *Industrial and Engineering Chemistry* 47 (4):719–730.

Hochman, 1976, "Catastrophic Deterioration of High Temperature Alloys in Carbonaceous Atmospheres," *Proceedings of the Symopsium on Properties of High Temperature Alloys*, pp. 715–732.

Hochman and Burson, 1996 "The Fundamentals of Metal Dusting," *Proceedings Division of Refining*,46:331–344.

Juve–Duc et al.,"Corrosion Behavior of an 18–10 Stainless Steel Protected by a Layer of Alloyed Ferrite," *Corros. Prot. Offshore, Commun., Symp. Int.*, 1979, Translation provided. pp. 1–7.

King et al., "The Production of Ethylene by the Decomposition of n–Butane; the Prevention of Carbon Formation by the Use of Chromium Plating", Transactions of the E.I.C., vol. 3, No. 1, p. 1 (1959).

Koch, "Localized Corrosion in Halides Other than Chlorides", MP/Jun. 1993, pp. 54–58.

Krisher, "Austenitic Stainless Steels", Process Industries Corrosion, NACE 1986, pp. 415–426.

Little, *Cataylic Reforming*, PennWell Publishing Co., Tulsa, Ok., 1955, pp. 136–141.

McClung, 1990, "Reformer Operation Improved by Feed Sulfur Removal," *Oil & Gas Journal*, pp. 98–99.

McGill and Weinbaum, "The Selection, Application and Fabrication of Alonized Systems in the Refinery Environment", 1975. pp. 1–18.

McIntyre et al., "Guidelines for Preventing Stress Corrosion Cracking in the Chemical Process Industries", Mar., 1985, MTI Publication No. 15., pp. 152–154; 176–180; 205–508; 250–251; 278.

McIntyre, "Environmental Cracking", Process Industries Corrosion, NACE 1986, pp. 21–30.

Platt's International Petrochemical Report (Oct. 1993). no page numbers.

Polk, "Evaluating Catalytic Reformer Heater Tubing After Extended High–Temperature Service," The International Corrosion Forum Devoted Exclusively to the Protection and Performance of Materials, Paper No. 50, Mar. 3–7, 1980, Palmer House. Chicago, Illinois.

Prange, 1959 "Corrosion in a Hydrocarbon Conversion System," *Corrosion*, 15(12):619t–621t.

Pujado et al., 1984, "Production of LPG Olefins by Catalytic Dehydrogenation". *Energy Progress* 4(3):186–191.

Pujado et al., "Make $C_3$–$C_4$ Olefins Selectively", Hydrocarbon Processing; pp. 65–70; Mar. 1990.

Pujado et al.,"OGJ Report", Oil and Gas Journal; pp. 71–74; Mar. 1983.

Schueler, "Metal Dusting," *Hydrocarbon Processing*, Aug. 1972, pp. 73–75.

Shinohara et al., 1986 "Development of nondestructive technique for measuring carburization thickness and a new carburization—resisant alloy" *Werkstoffe und Korrosion* pp. 410–411.

Swales, "High Temperature Corrosion Problems in the Petroleum Refining and Petrochemical Industries," *In: Behaviour of High Temperature Alloys in Aggressive Environments*, Proceedings of the Petten International Conference, Oct. 15–18, 1979, pp. 45–82.

Thomas, Hydrocarbon Processing, Aug. 1972, pp. 66–68.

Tibetts, "The Carbon Gradient," *Corrosion* vol. 15 No. 12, Dec., 1959 (see General Motors).

Toyo Engineering Corp. and Kubota; "CORET, New Cracking Tube to Retard Coke Deposition"; Mar. 1986; pp. 1–5.

Toyo Engineering Corp and Kubota, "Development of Double–Layer Cast Tube for Anti–Carburization and the Retarding of Coke Deposition", pp. 1–11. 1986.

Ullmann's Encyclopedia of Industrial Chemistry, 5th edition, vol. B1 "Corrosion", pp. 8–16 to 8–25.

West, "Reforming for BTX," *SRI International: A Private Report by the Process Economics Program*, Report Number 50, May 1980, pp. 62–65.

Yeske, "Corrosion in the Pulp and Paper Industry", Process Industries Corrosion, NACE 1986, pp. 191–203.

Zamanzadeh et al., "Hydrogen absorption during electrodeposition and hydrogen charging of Sn ad Cd coatings on iron," *J. Elect. Chem. Soc.* 129(2):284–289.

* cited by examiner

METHOD FOR REMOVING REACTIVE METAL FROM A REACTOR SYSTEM

FIELD OF INVENTION

The invention is a method of removing reactive metal from at least a portion of a metal-coated hydrocarbon conversion reactor system, so that the reactive metal does not deactivate the hydrocarbon conversion catalyst. It is especially applicable to catalytic reforming processes using halided catalysts.

BACKGROUND AND RELEVANT REFERENCES

Platinum L-zeolite catalysts for low-sulfur reforming were invented in the early 1980's. After about 10 years of intensive effort, and much research, low sulfur reforming was commercialized in the early 1990's. Progress toward commercialization required many discoveries. Two key discoveries were the criticality of ultra-low sulfur levels in the feed, and the impact of these ultra-low sulfur levels on reactor metallurgy, i.e., the discovery of the need to prevent coking, carburization and metal dusting. A preferred way to prevent coking, carburization and metal dusting utilizes a metal protective layer, especially one comprising tin.

While commercialization of ultra-low sulfur reforming was being pursued, a second generation of sulfur-sensitive platinum L-zeolite catalysts were being developed. These new catalysts are halided. They allow operations at higher severity, tolerate a wide range of hydrocarbon feeds, have high activity and long life.

Recent attempts to utilize this second generation of catalysts for ultra-low sulfur reforming resulted in an unexpected and undesired reduction in catalyst activity. After much research and experimentation, it was discovered that the catalyst had been partially poisoned by the metal of the protective layer specifically by tin; which had been used to prevent carburization and metal dusting of the reactor system surfaces. Somehow, some of this tin had migrated and deposited on the catalyst. In contrast, when conventional platinum L-zeolite catalysts are used for ultra-low sulfur reforming in a tin-coated reactor system, neither tin migration nor catalyst deactivation due to tin migration are observed. The cause of these problems has now been traced to low levels of volatile hydrogen halides that, under certain conditions, evolve from the catalysts themselves. These halides interact with reactive tin and can deactivate the catalyst.

Therefore, one object of the present invention is to reduce catalyst deactivation by metal derived from a metal-coated reactor system. Another object of the invention is to reduce catalyst contamination from a freshly metal-coated reactor system which would otherwise result in catalyst deactivation. This new process will also improve the reproducibility of catalytic operations, since catalyst activity and life can be better predicted.

The use of metal coatings and metal protective layers, especially tin protective layers, in hydrocarbon conversion processes is known. These layers provide improved resistance to coking, carburization and metal dusting, especially under ultra-low sulfur conditions. For example, Heyse et al., in WO 92/1856 coat steel reactor systems to be used for platinum L-zeolite reforming with metal coatings, including tin. See also U.S. Pat. Nos. 5,405,525 and 5,413,700 to Heyse et al. Metal-coated reactor systems are also known for preventing carburization, coking and metal dusting in dehydrogenation and hydrodealkylation processes conducted under low sulfur conditions; see Heyse et al., in U.S. Pat. No. 5,406,014 and WO 94/15896. In the '014 patent, Example 3 shows the interaction of a stannided coupon with hydrocarbons, methyl chloride and hydrogen at 1000 and 1200° F. The coupon was stable to methyl chloride concentrations of 1000 ppm at 1000° F., showing that the tin coating is stable to halogens at reforming temperatures.

The use of catalysts treated with halogen-containing compounds for catalytic reforming is also known. See, for example U.S. Pat. No. 5,091,351 to Murakawa et al. Murakawa prepares a Pt L-zeolite catalyst and then treats it with a halogen-containing compound. The resulting catalyst has a desirable long catalyst has a desirable long catalyst life and is useful for preparing aromatic hydrocarbons such as benzene, toluene and xylenes from $C_6$–$C_8$ aliphatic hydrocarbons in high yield. Other patents that disclose halided L-zeolite catalysts include U.S. Pat. Nos. 4,681,865, 4,761,512 and 5,073,652 to Katsuno et al.; U.S. Pat. Nos. 5,196,631 and 5,260,238 to Murakawa et al.; and EP 498,182 (A).

None of these patents or patent applications disclose any problems associated with the metal-coated reactor systems. They neither teach the desirability nor the need for removing metal from the reactor system, especially not prior to catalyst loading or prior to hydrocarbon processing.

Indeed, the art teaches the advantages of combining one of the preferred coating metals—tin—with a reforming catalyst, specifically with a platinum L-zeolite catalyst. U.S. Pat. No. 5,279,998 to Mulaskey et al., teaches that activity and fouling rate improvements are associated with treating the exterior of the platinum L-zeolite catalyst with metallic tin particles having an average particle size of between 1 and 5 microns (tin dust). For example, Table I of the Mulaskey patent shows improved catalyst performance when metallic tin dust is combined with a platinum L-zeolite catalyst that has been treated with fluoride according to the process of U.S. Pat. No. 4,681,865.

In light of the above teachings, we were surprised to find a decrease in catalyst activity upon reforming in a freshly tin-coated reactor system using a halided platinum L-zeolite catalyst. (See Example 5 below.)

Tin-coated steels are known to be useful for a variety of purposes. For example, surface coating compositions, known as stop-offs or resists, are temporarily applied to portions of a steel tool surface to shield them during case hardening. For example, in U.S. Pat. No. 5,110,854 to Ratliff the stop-off is a water-based alkyd resin containing tin and titanium dioxide.

It is also known that reacting tin with steel at elevated temperatures results in coated steels having surface iron stannides. Aside from hydrocarbon processing, as discussed above, coated steels have been used in applications where steels with hard and/or corrosion resistant surfaces are desired. For example, Caubert in U.S. Pat. No. 3,890,686 describes preparing mechanical parts having coatings consisting of three iron stannides to increase the resistance of these parts to seizing and surface wearing. In Example 2, a piece of coated steel is prepared by heating the steel of 1060° F. in the presence of tin chloride ($SnCl_2$) and hydrogenated nitrogen for 1.5 hours.

It is also known to treat tin-coated steels to further modify their properties. For example, Galland et al., in U.S. Pat. No. 4,105,950 teach that hot dipping stainless steel into molten tin results in two intermetallic stannide layers, an outer FeSn layer and inner layer which comprises a mixture of Fe (Cr,Ni,Sn) and $FeSn_2$. The inner layer has a greater hardness. They teach that the outer layer can be removed by grinding, by reacting with 35% nitric acid containing a polyamine, or by electrochemical means, leaving behind the harder and more corrosion resistant inner layer.

Another example where tin-coated steel is modified in Carey II, et al., in U.S. Pat. No. 5,397,652. Here, tin-coated stainless steels are taught as roofing meterials and siding, especially for use in marine or saline environments. Carey II, et al. teach that hot-dipping stainless steel into molten tin results in a bonded tin coating and an underlying intermetallic alloy of chromium-iron-tin. They teach treating the coated steel with an oxidizing solution (aqueous nitric acid) to obtain a uniformly colored stainless steel. The nitric acid preferentially reacts with the bonded tin coating leaving behind the uniformly colored intermetallic alloy. None of these patents on coated steels are concerned with hydrocarbon conversion processing.

None of the art described above is concerned with the problems associated with reactive metals derived from metal coatings, such as tin coating, nor with the effect of these reactive metals on catalysts, especially platinum L-zeolite reforming catalysts.

We have discovered that there are problems associated with using metal-coated reactor systems—especially freshly-coated systems—in the presence of certain catalysts, and we have discovered the cause of and solutions for these problems. Thus, one object of the present invention is to reduce catalyst contamination from a freshly metal-coated reactor system. Another object of the invention is to ensure that catalyst contamination is avoided, for example when replacing a conventional catalyst with a halided catalyst.

SUMMARY OF THE INVENTION

In one embodiment, the invention is a method of removing reactive metal from at least a portion of a metal-coated reactor system that is used for converting chemicals, especially hydrocarbons. The method comprises contacting at least a portion of a reactor system containing reactive metal with a getter to produce movable metal, and fixating the movable metal, the getter, or both. The getter reacts with the reactive metal (derived from the coating metal) facilitating its removal from the reactor system. Preferable the movable metal and the getter are both fixated, for example by trapping using a solid sorbent.

Preferred metal coatings are those prepared from tin-, germanium-, antimony-, and aluminum-containing compositions. More preferable, the reactive metal comprises a tin-containing composition including elemental tin, tin compounds of tin alloys.

Preferably the getter is prepared from a gaseous halogen-containing compound; more preferable the getter comprises a hydrogen halide, especially HCl prepared in-situ. In a preferred embodiment, a conversion catalyst is then loaded into the reactors after the reactive metal is removed, and conversion operations begin.

In another embodiment, the invention is a method of removing reactive tin from at least a portion of a reactor system having freshly-stannided surfaces. The method comprises the steps of:

a) applying a tin plating, paint, cladding or other coating to a iron-containing base substrate portion of a reactor system;

b) heating the coated substrate at temperatures greater than 800° F., preferably in the presence of hydrogen to produce a reactor system having freshly-stannided surfaces and which contains reactive tin;

c) removing at least a portion of the reactive tin from the reactor system by contacting the reactive tin with a getter to produce movable tin; and d) sorbing or reacting the movable tin.

Preferably, the reactive tin is removed by contacting the surface portion with a gaseous halogen-containing compound, such as HCl. In general, the contacting is done at temperatures and flow rates sufficient to transport a significant amount of the movable tin out of the reactor and furnace tubes and onto a sorbent. Here again it is preferred that the method be conducted prior to catalyst loading.

In yet another embodiment, the invention is a method for reducing catalyst contamination from a metal which was used to coat a reactor system. The method comprises contacting a metal-coated reactor system prior to catalyst loading with a getter, preferably a gaseous halogen-containing compound, to produce movable metal; and removing and fixating at least a portion of the movable metal from the reactor system. The conversion catalyst is then loaded into the reactor system, and conversion operations begin with feed being converted to product in the reactor system. This method is preferably applied to a freshly-coated reactor system.

In yet another embodiment, the invention is a catalytic reforming process. The process comprises removing reactive tin from a tin-coated reforming reactor system by contacting a tin-coated reactor system with a halogen-containing compound to produce movable tin; mobilizing and sorbing the movable tin; loading a halided Pt L-zeolite catalyst into the reactor system; and reforming hydrocarbons to aromatics.

Among other factors, this invention is based on our observation that halided Pt L-zeolite catalysts are partially deactivated during the start-up phase of a catalytic reforming process, especially when the start-up is done in a freshly tin-coated reactor. This is in contrast to what is observed with conventional Pt L-zeolite catalysts (which are not halided); here catalyst deactivation due to a tin coating has not been noted.

The art appears to be totally silent about the presence of reactive metal in metal-coated hydrocarbon conversion reactor systems. Moreover, the art has not appreciated the need or desire to remove this reactive metal prior to catalyst loading, especially prior to loading halided catalysts. We have found that tin-coated reactor systems, especially those with freshly prepared tin intermetallics, can lose tin from the tin-coated surfaces when contacted with halogen-containing gases, for example, during the start-up of a reforming process using a halided Pt L-zeolite catalyst which evolves acid halides, including HCl. This metal loss results in tin depositing on the catalyst and reduced catalyst activity.

However, we have observed that after several start-up cycles, catalyst activity stabilized without significant further decline. Thus, we believe that a reactive tin in present in the freshly-coated reactors. When contacted with hydrogen halides (e.g., HCl and/or HF), this tin is unexpectedly mobilized and deactivated the platinum catalyst. Based on these discoveries, we have developed simple, inexpensive procedures that quickly and efficiently remove reactive tin from tin-coated reactor systems, preferably prior to catalyst loading. When the catalyst is then loaded into the reactors and hydrocarbon processing begins, the catalyst experiences little or no deactivation from the tin coating.

DETAILED DESCRIPTION OF THE INVENTION

In one broad aspect, the present invention is a process for removing reactive metal from at least a portion of a metal-coated reactor system. This process comprises contacting at least a portion of a metal-coated reactor system with a getter. Preferably the getter is a halogen-containing compound, more preferably HCl. The getter converts the reactive metal to movable metal, which is fixated. Optionally, the movable metal is also mobilized, for example to another location in the process equipment, prior to being fixated.

In another embodiment, the invention is a method for reducing catalyst contamination from a metal which was used to coat a reactor system. The method comprises contacting a metal-coated reactor system prior to catalyst loading with getter comprising a gaseous halogen-containing compound to produce movable metal. The movable metal is then removed from the reactor system. In one especially preferred embodiment, the invention is a method for reducing contamination of a Pt L-zeolite reforming catalyst by tin from a freshly tin-coated reactor system having intermetallic stannides on the surfaces to be contacted with hydrocarbons.

Although the terms "comprises" or "comprising" are used throughout this specification, these terms are intended to encompass both the terms "consisting essentially of", and "consisting of" in various preferred aspects and embodiments of the present invention.

As used herein, the term "reactor system" is intended to include the hot sections of chemical conversion units, especially hydrocarbon conversion units. These units typically comprise one or more conversion reactors and one or more furnaces comprising a plurality of furnace tubes to heat the feed. The term "reactor system" is also intended to include units comprising furnace tube reactors where conversion occurs in furnace tubes (i.e., inside the furnace). The "hot sections" of these units are those sections where the feed is at or above the reaction or process temperature, and/or where the hydrocarbon conversion reactions occur.

As used herein, the term "metal-coated reactor system" is intended to include reactor systems (see above) having a metal-containing cladding, plating, paint or other coating, applied to at least a portion of the surfaces that are to be contacted with hydrocarbons at or above process temperature. Preferably at least half, more preferably at least three quarters, most preferably all of the surface area that is be contacted with hydrocarbons at or above process temperature. The term "metal-coated reactor system" is also intended to include reactor systems having protective layers, such as intermetallic layers that are prepared from claddings, platings, paints or coatings. Depending on the metal, a reactor system having a coating applied thereto may be cured by heating, preferably in a reducing environment, to produce intermetallic layers. The metal-coated reactor system preferable comprises a base construction material (such as a carbon steel, a chromium steel, or a stainless steel) having one or more adherent metallic layers attached thereto. Examples of metallic layers include elemental chromium, aluminized surfaces and iron-tin intermetallic compounds such as $FeSn_2$. Freshly-coated reactor systems, for example ones that have been freshly-stannided, are those which has not been used for hydrocarbon processing since coating, or since coating and curing.

As used herein, the term "metal-containing coating" or "coating" is intended to include claddings, platings, paints and other coating which contain either elemental metals, metal oxides, organometallic compounds, metal alloys, mixtures of these components and the like. The metal(s) or metal compounds are preferably a key component(s) of the coating. Flowable paints that can be sprayed or brushed are a preferred type of coating.

As used herein, the term "halogen-containing compound" or "halogen-containing gas" includes, but is not limited to, elemental halogen, acid halides, alkyl halides, aromatic halides, other organic halides including those containing oxygen and nitrogen, inorganic halide salts and halocarbons or mixtures thereof. Water may optionally be present.

As used herein, the term "reactive metal", such as "reactive tin", is intended to include elemental metals or metal compounds that are present on metal-coated reactor system surfaces and that can be mobilized at process or furnace tube temperatures, for example in the presence of dilute gaseous HCl, i.e., in the presence of between about 0.1 to about 100 ppm HCl. For instance, reactive tin has been observed when a halided catalyst which can evolve HCl was used for catalytic reforming in a freshly tin-coated reactor system having freshly-prepared, intermetallic, stannide layers. When used in the context of reforming, the term "reactive tin" comprises any one of: elemental tin, tin compounds, tin intermetallics and tin alloys that will migrate at temperatures between 600–1250° F. when contacted with a getter, and which would thereby result in catalyst deactivation during reforming operations or during heating of the reformer furnace tubes. In other contexts, the presence of reactive metal will depend on the particular metal, the getter, as well as the hydrocarbon conversion process and its operating conditions. Screening tests, as described in the examples, can be modified for the particular metal and process of interest to determine if reactive metal will be present during processing and therefore cause problems.

The term "movable metal" or "movable tin" is also used herein. It refers to the reactive metal (e.g., tin) after reaction with the getter. Generally, it is the movable metal that is fixated.

Although discussed hereinafter in terms of providing tin-intermetallic layers or tin coatings, it is believed that germanium-, arsenic- and antimony-intermetallic layers, especially freshly prepared layers also comprise reactive metal, and that our discoveries are also applicable to these metals. The discussion herein of tin coating or tin-intermetallic layers is merely intended to exemplify a preferred embodiment, and is not intended to limit the invention to tin coatings or tin intermetallics.

Getters and Halogen Sources

The "getter" of this invention is any composition that will interact with the reactive metal and facilitate its removal from the reactor system. Contacting the getter with the reactive metal converts it to a form that is movable and therefore can be removed from the reactor system, e.g., by a hot flowing gas. As will be appreciated by one skilled in the art, the effectiveness of a getter will depend on the contacting time and temperature, the getter concentration, the particular reactive metal and its chemical and physical form.

Preferred getters are halogen-containing compounds or are prepared from these compounds. Useful getters comprise organic halides, including halocarbons, and inorganic halides, as well as inorganic halides, including metal halides and hydrogen halides. Some examples of halogen-containing compounds that are useful in this invention include HCl, $Cl_2MeCl$, benzyl chloride, benzoyl chloride and $NH_4Cl$; HBr, $Br_2$, MeBr, benzyl bromide and; $NH_4I$ HF, $F_2$, and MeF; HI, $I_2$, MeI, iodobenzene, and $NH_4I$; $CCl_4$, $C_2Cl_4$, $C_2Cl_6$, $C_2H_2Cl_2$, and $CF_4$, $CF_3Cl$, $CF_2Cl_2$, $CFCl_3$, $CHFCl_2$, $CHF_2Cl$, $CHF_3$, $C_2F_2Cl_4$, $C_2F_4Cl_2$ and $C_2H_4F_2$. Other useful organic halogen-containing compounds include those containing heteroatoms such as oxygen and nitrogen, e.g., chloropyridine, acetoyl bromide and amine salts of acid halides, e.g., pyridine hydorchloride. Other useful getters include metal halides such as $SnCl_4$, $GeCl_4$, $SnHCl_3$; transition metal halides such as iron chloride, chromium chloride, copper chloride, nickel chloride, etc., especially in their highest oxidation state; and halided support materials or other solids which can produce HCl upon heating.

Preferred halogen-containing compounds are those that can readily produce HCl in situ; for example by reaction with hydrogen and a Pt catalyst. These include $C_2Cl_4$, MeCl, and $CCl_4$. The most preferred getter comprises a hydrogen halide, more preferable HCl. It is believed that other volatile acids would also be effective getters, especially when the resulting movable metal (compound) is volatile at process temperatures. The HCl can be provided as a gas; however, it is preferred to generate the HCl in-situ. This can readily be accomplished by reacting a halogen-containing compound such as perchloroethylene with hydrogen over a nickel or platinum catalyst, such as Raney nickel or a conventional Pt on alumina reforming catalyst, at elevated temperatures, for example at about 900° F.

The halogen-containing compounds are preferable present in dilute concentration. Concentrations between about 0.1 and 1000 ppm are preferred, more preferably between 1 and 500 ppm, most preferably between 10 and 200 ppm. The diluent preferably comprises hydrogen, especially when HCl is prepared in-situ. Preferably the hydrogen is combined with an inert gas, such as nitrogen. For catalysts that are irreversibly poisoned by sulfur, such as non-acidic Pt L-zeolite catalyst, it is important to use a halogen-containing gas that is substantially free of sulfur, preferably one having less that 10 ppb sulfur. When HCl concentrations are too high, or temperatures are too hot, undesirable removal of the protective layers may occur, leaving the underlying substrate (e.g., steel) susceptible to attack.

A preferred sulfur-free gas comprises nitrogen, and the process preferably includes a step where a hydrogen-nitrogen gas mixture (e.g., 10% hydrogen in nitrogen) is used during the metal removal step. For example, a nitrogen and/or hydrogen stream can be spiked with small amounts of getter.

While not wishing to be bound by theory, it is believed that, especially in a freshly-coated reactor system comprising surface intermetallics, there will be some metal that has not reacted with the base construction material. This unreacted coating metal is believed to be, at least in part, the reactive metal that is removed in the process of this invention. For example, when iron and nickel stannides are produced by curing/reduction of tin paints on steel, a fine tin-containing dust is observed on the stannided surface. When examined by petrographic analysis, the metal surface contains tiny microscopic tin balls which are believed to be unreacted tin. Some of these balls appear to be sitting on the intermetallic surface while others are connected to the surface via what appears to be stannide roots. It is this unreacted tin that we believe is removed by the process of this invention.

The amount of unreacted tin and tin dust that is present depends on a variety of factors. These include the thickness of the coating, the cure conditions that were used to prepare the stannides, and the type of steel or other base metallurgy to which the tin coating was applied. The process of this invention removes a substantial portion of this dust and unreacted tin from the reactor system surfaces.

Alternatively, it is envisioned that the getter would transform the reactive metal into an inactive form. For example, the getter could convert the reactive metal to an immobile form, which effectively fixates it.

Fixating and Fixating Agents

Fixating the movable metal ensures that it will not deactivate the hydrocarbon conversion catalyst. The term "fixating" as used herein means to purposely immobilize the metal or metal compounds produced from the reactive metal by the getter in order to reduce or prevent catalyst contamination. Fixating also refers to sorbing, reacting or otherwise immobilizing the getter. This fixating may be done using chemical or physical treating steps or processes. The fixated metal may be concentrated, recovered, or removed from the reactor system. For example, the movable metal may be fixated by contacting it with an adsorbent, by reacting it with compound that will immobilize the metal, or by dissolution, e.g., by washing the reactors system surfaces with a solvent and removing the dissolved movable metal. Solid sorbents are preferred fixating agents.

In an especially preferred embodiment, a gas comprising HCl is used as the getter. Then effluent HCl, residual halogen-containing gas (if present) and movable metal, (e.g., in the form of $SnCl_2$) are all fixated by sorption. The sorbent is a solid or liquid material (an adsorbent or absorbent) which will trap the movable metal. Solid sorbents are generally preferred as they are easy to use and subsequently easy to remove from the system. The choice of sorbent or metal trap, depends on the particular form of the movable metal and its reactivity. Suitable liquid sorbents include water, liquid metals such as tin metal, caustic, and other basis scrubbing solutions.

Suitable solid sorbents effectively immobilize the movable metal by adsorption or by reaction. The sorbent preferable has a high surface area (>10 m$^2$/g), interacts strongly with the movable metal (has a high coefficient of adsorption) or reacts with the movable metal to immobilize the metal. The sorbent preferable retains its physical integrity after fixating the movable metal (e.g., has acceptable crush strength, attrition resistance etc.). Suitable sorbents include metal turnings, such as iron turnings which will react with movable tin chloride. Preferred sorbents include aluminas, clays, silicas, silica aluminas, activated carbon, and zeolites. A preferred sorbent is basic alumina, such as potassium on alumina, especially calcium on alumina.

The location of the sorbent is not critical. For example, it can be located in one or more of the reactors, or preferably at or downstream of the last reactor, or in a special knockout reactor. If the metal removal process is done prior to catalyst loading, it is preferred to place a solid sorbent at the bottom of the last reactor, or just prior to the heat exchangers. In this way, all surfaces that are contacted with getter are located before the sorbent. If the removal process is done with catalyst present, it is preferred to place solid sorbent on the top of each reactor bed. In this instance, it is envisioned that getter should be injected near each furnace inlet and the movable metal would be sorbed before reaching the catalyst beds. Here, a major portion of the coated surface would be contacted with the getter, and most of the reactive metal would be fixated.

The movable metal can be fixated simultaneously as it is reacted with the getter or in one or more separate steps. For example, movable tin, such as tin chloride, can be formed at temperatures where tin chloride is volatile, and the tin chloride is then immediately contacted with a solid sorbent. Alternatively, after contacting the reactive tin with HCl at about 600° F., the reactor system can be cooled (e.g., to ambient temperature) and produced metal halide (e.g., tin chloride) can then be mobilized and fixated by washing it out of the reactor system with water or another suitable solvent. In another two-step process, tin chloride can be produced on the reactor system surfaces at a first lower temperature and then removed from the reactor system at a second higher temperature where tin chloride is volatile. The volatile tin chloride is then fixated downstream or at the outlet of the reactor system.

The amount of fixating agent is not critical, so long as there is a sufficient amount to fixate the movable metal, e.g., a sufficient amount of sorbent to sorb the desired amount of movable metal. Generally, it is also advantageous to sorb any getter, such as HCl, present in the reactor effluent.

Ways to Remove Reactive Metal

There are a variety of ways to remove reactive metal from a metal-coated reactor system. The method used and its effectiveness depends on the coating metal and on the configuration and planned operations of the reactor system. For example, if the reactive metal is in the furnace tubes, these tubes can be temporarily connected in a loop, and a heated solution or gaseous composition containing getter can be circulated through the loop. Here it is envisioned that the getter solution could also serve as the fixating agent. After sufficient contact time, it would be drained or otherwise removed. Alternatively, if the movable metal is formed as a gas, it can be fixated, e.g., by sorption, during gas circulation.

If the reactive metal is located within a reactor, then it is preferred to remove this reactive metal by contacting the metal-coated surfaces with a getter, preferably a halogen-containing gas at hydrocarbon conversion conditions. For example, a halided support material, such as a halided catalyst base (i.e., one free of catalytic metal) can be placed in the first reactor, optionally along with a catalyst that converts halogen-containing compounds and hydrogen to HCl. The halided catalyst base can be prepared, for example, by impregnating $NH_4Cl$ onto alumina. Following typical catalyst start-up procedures, hydrogen halides will evolve gradually from the halided catalyst base as the temperature increases. This approach models conditions that will occur when catalyst is present. Here the coated reactor system is treated in a manner similar to that which will occur when catalyst is present.

It is preferred that prior to contacting the reactor system with the getter, the coated reactor system is visually inspected, and where practical, any observed excess metal is manually removed. Care should be taken so that this physical removal does not result in portions of the reactor system being unprotected during hydrocarbon processing.

The metal removal step is preferably done in the absence of the process catalysts and hydrocarbons. The metal-coated steel is contacted, preferably after curing, with a getter such as a HCl, preferably at temperatures and pressures similar to those at which the hydrocarbon conversion process will be operated. The metal removal step may remove a portion of the metal coating. However, the remaining coating is significantly less susceptible to further metal loss, for example, in subsequent start-up cycles. Of course, it is important that a sufficiently thick coating layer remain which is still effective for its intended purpose, e.g., for preventing carburization, coking and metal dusting.

The metal removal process is continued until most of the reactive metal is removed. Preferably the removal is continued until the rate of metal removal has declined substantially. For a freshly-coated reactor system, it is preferred that metal weight loss be measured every 10 hours. The removal process is continued until the rate of metal weight loss is about 20% of the original rate of metal weight loss.

There are numerous ways to determine when to stop adding getter to the reactor system. Metal-coated, removable coupons can be used to determine when to discontinue adding getter. For example, small by-pass streams can be provided near the furnace and/or the reactor. A section of the by-pass stream can be used to house the coated coupons. This section should be able to be isolated from the other part of the by-pass stream by valves. During the metal removal process, these valves can be closed periodically and coupons can be removed for inspection or to determine the metal weight loss of the coupons. Actual metal weight loss curves for these coupons can be compared with the curve shown in FIG. 3. The metal removal process can be ended after the metal weight loss has leveled off, e.g., when the knee of the curve has been passed.

In commercial operations, a pre-test using coated coupons in a pilot plant can be used to determine a target metal weight loss. Given this target, removable coated coupons can be placed in the reactor system and weighed at intervals. When the target weight loss is achieved, the metal removal process is discontinued. It is preferred that the pre-tests be done at temperatures typical of the hottest portion of the reactor system.

Alternatively, visual or microscopic inspections of the reactor system surface can be used to determine when to stop adding getter in the metal removal process. For example, the reactors can be opened and inspected. If tin dust is still present on the reactor surface, removal operations are continued. If this dust is absent or has been converted to tin chloride (which is readily identified as it is water soluble), then the addition of getter can be terminated.

Our data on tin weight losses over multiple startups suggests that a significant portion of the reactive tin is removed relatively quickly, followed by a more gradual loss. See FIG. 3. Calculations show that this later gradual loss would only deposit approximately 50 ppm tin on the catalyst per start-up, which we expect will reduce catalyst activity only slightly, by less than 1° F.

Platings, Claddings, Paints and Other Coatings

Metal coatings are typically applied to reactor systems to improve process operability. The reactor systems of this invention have generally had metallic protective layers applied to reduced coking, carburization and metal dusting.

The invention does not apply to all coating metals. Many metal-containing platings, claddings, paints and coatings do not produce reactive metals under conversion/process conditions. However, simple tests such as those described in the examples will readily identify metals and coatings that require the metal removal process of this invention.

The metal used in the coating depends on the requirements of the hydrocarbon conversion process of interest, for example, its temperatures, reactants, etc. Coating metals that melt below or at process conditions and form intermetallic complexes with the substrate material are especially preferred. They are able to more readily provide complete substrate coverage. These metals include those selected from among tin, antimony, germanium, arsenic, bismuth, aluminum, gallium, indium, copper, and mixtures, intermetallic compounds and alloys thereof. Preferred metal-containing coatings comprise metals selected from the group consisting of tin, antimony, germanium, arsenic, bismuth, aluminum, and mixtures, intermetallic compounds and alloys of these metals. Especially preferred coatings include tin-, antimony-and germanium-containing coatings. These metals will form continuous and adherent protective layers. Tin coatings are especially preferred—they are easy to apply to steel, are inexpensive and are environmentally benign. The most preferred metals interact with, or more preferably react with, the base material of the reactor system to produce a continuous and adherent metallic protective layer at temperatures below or at the intended hydrocarbon conversion conditions.

Metal-containing coatings that are less useful include certain metal oxide coatings such as those containing molybdenum oxide, tungsten oxide and chromium oxides. In part this is because it is difficult to form adherent metallic protective layers from these oxides at temperatures where hydrocarbon conversion equipment is operated.

It is preferred that the coatings be sufficiently thick that they completely cover the base metallurgy, and that after removal of the movable metal, the resulting protective layer remain intact, so it can protect the steel for years of operation. At the same time, thin layers are desirable. Thin layers can be produced readily, are less costly than thicker layers, and are less likely to fracture under thermal stress. Thus, the optimum thickness of the protective layer depends on the intended use conditions and the specific coating metal. For example, tin paints may be applied to a (wet) thickness of between 1 to 6 mils, preferably between about 2 to 4 mils. In general, the thickness after curing is preferably between about 0.1 to 50 mils, more preferably between about 0.5 to 10 mils, most preferably about 1 mil. Also, it is desirable that the coating and any produced intermetallic layers at least initially be firmly bonded to the steel; this can be accomplished, for example, by curing at elevated temperatures. For example an applied tin paint can be cured in hydrogen at 1100° F. for 24 hours.

Metal-containing coatings can be applied in a variety of ways, which are well known in the art. These include electroplating, chemical vapor deposition, and sputtering, to name just a few. Preferred methods of applying coatings include painting and plating. Where practical, it is preferred that the coating be applied in a paint-like formulation (hereinafter "paint"). Such a paint can be sprayed, brushed, pigged, etc. on reactor system surfaces.

Tin is a preferred coating metal and is exemplified herein; disclosures herein about tin are generally applicable to other metals such as germanium. Preferred paints comprise a metal component selected from the group consisting of: a hydrogen decomposable metal compound such as an organometallic compound; a finely divided metal; and a metal oxide, preferably a metal oxide that can be reduced at process or furnace tube temperatures. In a preferred embodiment a cure step is used to produce a intermetallic protective layer bonded to the steel through an intermediate bonding layer, for example a carbide-rich bonding layer. This is described in U.S. Pat. No. 5,406,014 to Heyse et al., which is incorporated herein in its entirety.

Some preferred coatings and paint formulations are described in U.S. Ser. No. 803,063 to Heyse et al., corresponding to WO 92/15653, which is also incorporated herein by reference in its entirety. One especially preferred tin paint contains at least four components or their functional equivalents: (i) a hydrogen decomposable tin compound, (ii) a solvent system, such as isopropanol, (iii) finely divided tin metal and (iv) tin oxide. As the hydrogen decomposable tin compound, organometallic compounds such as tin octanoate or neodecanoate are particularly useful. Component (iv), the tin oxide is a porous tin-containing compound which can sponge-up the organometallic tin compound, and can be reduced to metallic tin. The paints preferably contain finely divided solids to minimize settling. Finely divided tin metal, component (iii) above, is also added to insure that metallic tin is available to react with the surface to be coated at as low a temperature as possible. The particle size of the tin is preferably small, for example one to five microns. When tin paints are applied at appropriate thicknesses, heating under reducing conditions will result in tin migrating to cover small regions (e.g., welds) which were not painted. This will completely coat the base metal.

Cure Process Conditions

Some coating compositions need to be cured by heat treatment to produce continuous and adherent protective layers. Cure conditions depend on the particular metal coating as well as the hydrocarbon conversion process to which the invention is applied. For example, gas flow rates and contacting time depend on the process configuration, the coating metal the components of the coating composition, and the cure temperature. Cure conditions are selected to result in a continuous and uninterrupted protective layer which adheres to the steel substrate. Cure conditions may be readily determined. For example, coated coupons may be heated in the presence of hydrogen in a simple test apparatus; the formation of a continuous protective layer may be determined using petrographic analysis.

As discussed above, it is preferred to contact the metal-coated reactor system with the getter after the curing step, especially when intermetallics are formed during heat treatment. Tin paints are preferably cured between 900° F. and 1100° F.; germanium and antimony paints are preferably cured between 1000° F. and 1400° F. Curing is preferably done over a period of hours, often with temperatures increasing over time when the paint contains reducible oxides and/or oxygen-containing organometallic compounds. Reduction/curing is preferably done using a gas containing hydrogen, more preferably in the absence of hydrocarbons.

As an example of a suitable paint cure for a tin paint, the system including painted portions can be pressurized with flowing nitrogen, followed by the addition of a hydrogen-containing stream. The reactor inlet temperature can be raised to 800° F. at a rate of 50–100° F./hr. Thereafter the temperature can be raised to 950–975° F. at a rate of 50° F./hr, and held for about 48 hours.

In a preferred embodiment the metal-coated reactor system comprises an intermetallic layer. This layer (which covers a base construction material such as a steel substrate) contains two or more metals, the metals being present in a stoichiometric ratio, i.e., as intermetallic compounds. Intermetallic compounds are well known in the art; they are more structured than molecular mixtures or alloys. Moreover, they have physical properties (such as color) and chemical properties that are unique to the intermetallic phase.

For example, an intermetallic stannide layer contains tin intermetallic compounds comprising tin and at least one other metal, the tin and the other metal(s) being present in compounds which have a stoichiometric ratio of elements that vary only within a narrow range. Examples of these tin intermetallic compounds are $Fe_3Sn$, $FeSn_2$, $Ni_3Sn_2$, $Ni_3Sn$, $Ni_3Sn_4$. Other examples include mixed metal intermetallic stannides, for example $(Fe,Ni)_xSn_y$ where Fe and Ni substitute freely for one another, but summed together are present in a stoichiometric ratio with the tin.

The Base Construction Material

There are a wide variety of base construction materials to which the process of this invention may be applied. In particular, a wide range of steels and alloys may be used in the reactor system. In general, steels are chosen so they meet minimum strength and flexibility requirements needed for the intended hyrdocarbon conversion process. These requirements in turn depend on process conditions, such as operating temperatures and pressures. Additionally, the steel is chosen so it is not susceptible to expected corrosion hazards.

Useful steels include carbon steel; low alloy steels such as 1.25, 2.25, 5, 7, and 9 chrome steel with or without molybdenum; 300 series stainless steels including type 304, 315 and 347 stainless steel; heat resistant steels including HK-40, HP-50 and manurite, as well as treated steels, such as aluminized or chromized steels.

Conversion Processes

The invention is applicable to a variety of conversion processes which use catalysts to convert feed to products in metal-coated reactor systems. In particular, the invention is applicable to hydrocarbon conversion processes that use catalysts which can be deactivated by reactive metal from the reactor system coating. Preferred hydrocarbon conversion processes include dehydrocyclization, especially dehydrocyclization of $C_6$ to $C_8$ paraffins to aromatics; catalytic reforming; non-oxidative and oxidative dehydrogenation of hydrocarbons to olefins and dienes; dehydrogenation of ethylbenzene to styrene and/or dehydrogenation of isobutane to isobutylene; conversion of light hydrocarbons to aromatics; transalkylation of toluene to benzene and xylenes; hydrodealkylation of alkylaromatics to aromatics; alkylation of aromatics to alkylaromatics; production of fuels and chemicals from syngas ($H_2$ and CO); steam reforming of hydrocarbons to $H_2$ and CO; production of phenylamine from aniline; methanol alkylation of toluene to xylenes; and dehydrogenation of isopropyl alcohol to acetone. More preferred hydrocarbon conversion processes include dehydrocyclization, catalytic reforming, dehydrogenation, isomerization, hydrodealkylation, and conversion of light hydrocarbon to aromatics, e.g., Cyclar-type processing. These processes and the useful range of process conditions are all well known in the art.

Preferred embodiments include those where a catalyst, preferably a platinum catalyst is used. Preferred processes include dehydrocyclization of a $C_3$–$C_4$ paraffin to an olefin, for example the Oleflex® process, or dehydrocyclization of a paraffin feed containing feed and $C_6$, $C_7$, and/or $C_8$ hydrocarbons to aromatics (for example, processes which produce benzene, toluene and/or xylenes) such as the Aromax® process. In one preferred embodiment the method of removing reactive metal is applied to a metal-coated dehydrogenation reactor system having a major portion of its furnace tubes and reactor surfaces coated with said coating metal, preferably with tin.

The present invention is especially applicable to hydrocarbon conversion processes which require catalysts, especially halided catalysts, having noble metals such as Pt, Pd, Rh, Ir, Ru, Os, particularly Pt containing catalysts. These metals are usually provided on a support, for example, on carbon, on a refractory oxide support, such as silica, alumina, chlorided alumina or on a molecular sieve or zeolite. Preferred catalytic processes are those utilizing platinum on alumina, Pt/Sn on alumina and Pt/Re on chlorided alumina; noble metal Group VIII catalysts supported on a zeolite such as Pt, Pt/Sn and Pt/Re on zeolites, including L-type zeolites, ZSM-5, SSZ-25, SAPO's, silicalite and beta.

Examples of such processes include catalytic reforming and/or dehydrocyclization processes, such as those described in U.S. Pat. No. 4,456,527 to Buss et al. and U.S. Pat. No. 3,415,737 to Kluksdahl; catalytic hydrocarbon isomerization processes such as those described in U.S. Pat. No. 5,166,112 to Holtermann; and catalytic hydrogenation/dehydrogenation processes.

Metal-coated reactor systems are especially useful in processes operated under low sulfur conditions, since the coating provides improved resistance to coking, carburization and metal dusting. This, in an especially preferred embodiment of the invention, the hydrocarbon conversion process is conducted under conditions of "low sulfur". In these low-sulfur systems, the feed will preferably contain less than 50 ppm sulfur, more preferably, less than 20 ppm sulfur and most preferably less than 10 ppm sulfur. In another preferred embodiment, the invention is conducted under conditions of "ultra-low sulfur". Here sulfur levels are preferably below 100 ppb, more preferably below 50 ppb, and most preferably below 20 ppb S, with sulfur levels below 10 ppb and especially below 5 ppb being particularly preferred.

One preferred embodiment of the invention involves the use of a medium-pore size or large-pore size zeolite catalyst including an alkali or alkaline earth metal and charged with one or more Group VIII metals. Most preferred is the embodiment where such a catalyst is used in reforming or dehydrocyclization of a paraffinic naphtha feed containing $C_6$, and/or $C_8$ hydrocarbons to produce aromatics, for example a $C_6$ to $C_8$ UDEX raffinate. The invention is especially applicable to ultra-low sulfur reforming using an intermediate or large pore zeolite catalyst containing halogens, especially a halided platinum on non-acidic L-zeolite catalyst.

By "intermediate pore size" zeolite is meant a zeolite having an effective pore aperture in the range of about 5 to 6.5 Angstroms when the zeolite is in the H-form. These zeolites allow hydrocarbons having some branching into the zeolitic void spaces and can differentiate between n-alkanes and slightly branched alkanes compared to larger branched alkanes having, for example, quaternary carbon atoms. Useful intermediate pore size zeolites include ZSM-5 described in U.S. Pat. Nos. 3,702,886 and 3,770,614; ZSM-11 described in U.S. Pat. No. 3,709,979; ZSM-12 described in U.S. Pat. No. 3,832,449; ZSM-21 described in U.S. Pat. No. 4,061,724; and silicalite described in U.S. Pat. No. 4,061,724. Preferred zeolites are silicalite, ZSM-5, and ZSM-11. A preferred Pt on zeolite catalyst is described in U.S. Pat. No. 4,347,394 to Detz et al.

By "large-pore size zeolite" is meant a zeolite having an effective pore aperture of about 6 to 15 Angstroms. Preferred large pore zeolites which are useful in the present invention include type L-zeolite, zeolite X, zeolite Y and faujasite.

Zeolite Y is described in U.S. Pat. No. 3,130,007 and Zeolite X is described in U.S. Pat. No. 2,882,244. Especially preferred zeolites have effective pore apertures between 7 to 9 Angstroms. In a preferred embodiment, the invention uses a medium-pore size or large-pore size zeolite catalyst containing an alkali or alkaline earth metal and charged with one or more Group VIII metals.

The zeolitic catalysts used in the invention are charged with one or more Group VIII metals, e.g., nickel, ruthenium, rhodium, palladium, iridium or platinum. Preferred Group VIII metals are iridium and particularly platinum. If used, the preferred weight percent platinum in the catalyst is between 0.1% and 5%. Group VIII metals can be introduced into zeolites by synthesis, impregnation or exchange in an aqueous solution of appropriate salt. When it is desired to introduce two Group VIII metals into the zeolite, the operation may be carried out simultaneously or sequentially.

Especially preferred catalysts for use in this invention are Group VIII metals on large pore zeolites, such as L-zeolite catalysts containing Pt, preferably Pt on non-acidic L-zeolite. Halided Pt L-zeolite catalysts are particularly preferred. The composition of type L-zeolite expressed in terms of mole ratios of oxides, may be represented by the following formula:

$(0.9-1.3)M_{2/n}O:Al_2O_3(5.2-6.9)SiO_2:yH_2O$

In the above formula M represents a cation, n represents the valence of M, and y may be any value from 0 to about 9. Zeolite L, its x-ray diffraction pattern, its properties, and methods of preparation are described in detail in, for example, U.S. Pat. No. 3,216,789, the contents of which is hereby incorporated by reference. The actual formula may vary without changing the crystalline structure. Useful Pt on L-zeolite catalysts also include those described in U.S. Pat. No. 4,634,518 to Buss and Hughes, in U.S. Pat. No. 5,196,631 to Murakawa et al., in U.S. Pat. No. 4,593,133 to Wortel and in U.S. Pat. No. 4,648,960 to Poeppelmeir et al., all of which are incorporated herein by reference in their entirety. Preferably the catalyst be substantially free of acidity.

In an especially preferred embodiment, the invention is a catalytic reforming method which uses a halided Pt L-zeolite catalyst. Prior to catalyst loading and reforming, reactive metal is removed from a tin-coated reforming reactor system. The process comprises:

a) removing reactive metal from a metal-coated reforming reactor system by contacting the metal-coated reforming reactor with a getter to produce movable metal;

b) sorbing the movable metal;

c) loading a halided Pt L-zeolite catalyst into the reactor system; and d) reforming hydrocarbons to aromatics.

Preferably the mobile metal is sorbed onto a solid sorbent and the sorbent is located before the feed effluent heat exchanger.

In a more preferred embodiment the reforming process comprises:

a) coating a reforming reactor system with a tin-containing paint;

b) contacting the painted reactor system with a hydrogen-containing gas at 800–1150° F. to produce stannides;

c) removing reactive tin from said reforming reactor system by contacting the reactor system with a gaseous stream containing HCl to produce movable tin;

d) fixating the movable tin by adsorption onto a solid sorbent;

e) loading a halided Pt L-zeolite catalyst into the reactor system; and f) catalytically reforming hydrocarbons to aromatics under ultra-low sulfur reforming conditions of less than 10 ppb sulfur.

Thus, one preferred embodiment of the invention uses Pt L-zeolite catalysts treated with halogen-containing compounds, referred to herein as halided catalysts. These special types of catalysts have recently been disclosed. For example, U.S. Pat. No. 5,091,351 to Murakawa et al., discloses preparing a Pt L catalyst, and then treating it with a halogen-containing compound. Other related patents that disclose halided L-zeolite catalyst include EP 498,182 A which discloses co-impregnation with $NH_4Cl$ and $NH_4F$; U.S. Pat. Nos. 4,681,865, 4,751,512 and 5,073,652 to Katsuno et al.; U.S. Pat. Nos. 5,196,631 and 5,260,238 to Murakawa et al. These catalysts also include spent catalyst that have been rejuvenated by adding halogen-containing compounds (see, e.g., U.S. Pat. No. 5,260,238). These patents are all incorporated herein by reference. The halided catalysts described in these patens have been treated with halogen-containing compounds, generally with chlorine-containing and/or fluorine-containing compounds. Preferably, the catalysts have been treated with both chlorine and fluorine-containing compounds or with one or more compounds containing both chlorine and fluorine. These halided catalysts have a desirably long catalysts life and activity. They are especially useful for preparing aromatic hydrocarbons such as benzene, toluene and xylenes from $C_6$–$C_8$ aliphatic hydrocarbons.

We have observed that these halided catalysts evolve small amounts of HCl and/or HF when these special types of catalysts are heated at elevated temperatures (e.g., at process condition), or when contacted with hydrogen at temperatures above about 300–400° F. And, this produced acid halide gas reacts with reactive metal present in metal-coated reactor systems. Hence the need for the present invention. It should be noted that the above-described treatment with halogen-containing compound differs from that typically associated with platinum loading, e.g., by impregnation or ion exchange with compounds comprising platinum and halogen. This treatment also differs from that associated with wash solutions used during impregnation or ion exchange of conventional catalysts, where small amounts of halides may be added.

In some applications, for example in ultra-low sulfur reforming using non-acidic Pt L-zeolite catalysts, it is preferred that the feed to the catalyst be substantially free of sulfur, i.e. sulfur levels be maintained at below 50 ppb, preferably below 10 ppb and more preferably below 5 ppb.

Preferred reforming process condition include a temperature between 700 and 1050° F., more preferably between 800 and 1025° F.; and a pressure between 0 and 400 psig, more preferably between 15 and 150 psig; a recycle hydrogen rate sufficient to yield a hydrogen to hydrocarbon mole ratio for the feed to the reforming reaction zone between 0.1 and 20, more preferably between 0.5 and 10; and a liquid hourly space velocity for the hydrocarbon feed over the reforming catalyst of between 0.1 and 10, more preferably between 0.5 and 5.

To achieve the suitable reformer temperatures, it is often necessary to heat the furnace tubes to higher temperatures. These temperatures can often range from 800 to 1250° F., usually from 850 and 1200° F., and more often from 900 and 1150° F.

To obtain a more complete understanding of the present invention, the following example illustrating certain aspects of the invention are set forth. It should be understood, however, that the invention is not intended to be limited in any way to the specific details of the example.

EXAMPLE 1A

Stanniding Steel Using a Tin Paint

Coupons of type 321 type or type 347 stainless steel were coated with a tin-containing paint. The paint consisted of a mixture of 2 parts powdered tin oxide, 2 parts finely powdered tin (1–5 microns), 1 part stannous neodecanoate in neodecanioc acid (20% Tin Tem-Cem manufactured by Mooney Chemical Inc., Cleveland, Ohio which contained 20% tin as stannous neodecanoate) mixed with isopropanol, as described in WO 92/15653. The coating was applied to the steel surface by painting and letting the paint dry in air. After drying, the painted steel was contacted with flowing hydrogen at 1100° F. for 40 hr to produce a stannided steel surface comprising intermetallics including iron stannides.

Some experiments were done in a pilot plant having ¼" OD reactor tube made of 316 stainless steel. The reactor tube was coated with the tin-containing paint described above. The coating was applied to the inner surface of the pilot plant by filling the reactor tube with paint and letting the paint drain. After drying, the painted steel was cured with flowing hydrogen at 1100° F. for 40 hr.

EXAMPLE 1B

Analysis of Stannided Steel

The resulting tin coated steels with their intermetallic tin layers were examined visually for completeness of coating. Samples were mounted in a clear epoxy resin and then ground and polished in preparation for analysis with the petrographic and scanning electron microscopes (SEM). EDX analysis can be used to determine the chemical composition of the layers. The cross-sections of the materials showed that the tin paint had reduced to metallic tin under these conditions and formed a continuous and adherent metallic (iron/nickel stannide) protective layer on the steel surface. Nickel- and iron-containing stannides were present at a thickness of between about 2 to 5 microns. A nickel depleted underlayer (2–5 microns thick) was also present. On the surface, microscopic tin balls and globules were observed.

EXAMPLE 2

Preparing a Halided Platinum L-zeolite Catalyst

Figure 1:
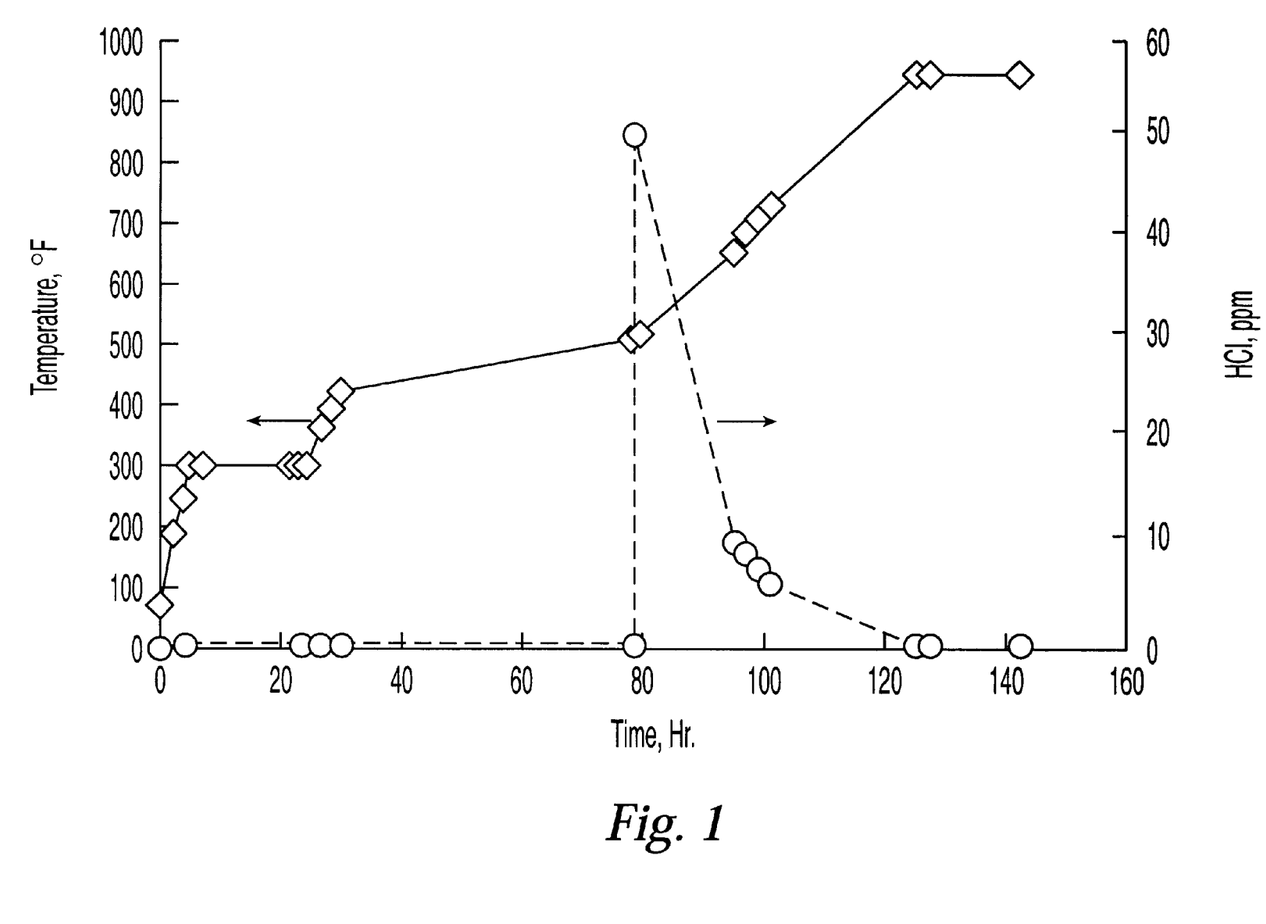
FIG. 1 shows HCl evolution (on right) from a halided reforming catalyst as a function of temperature (on left). Hydrogen was added at 500° F. at time=79 hours.
Figure 2:
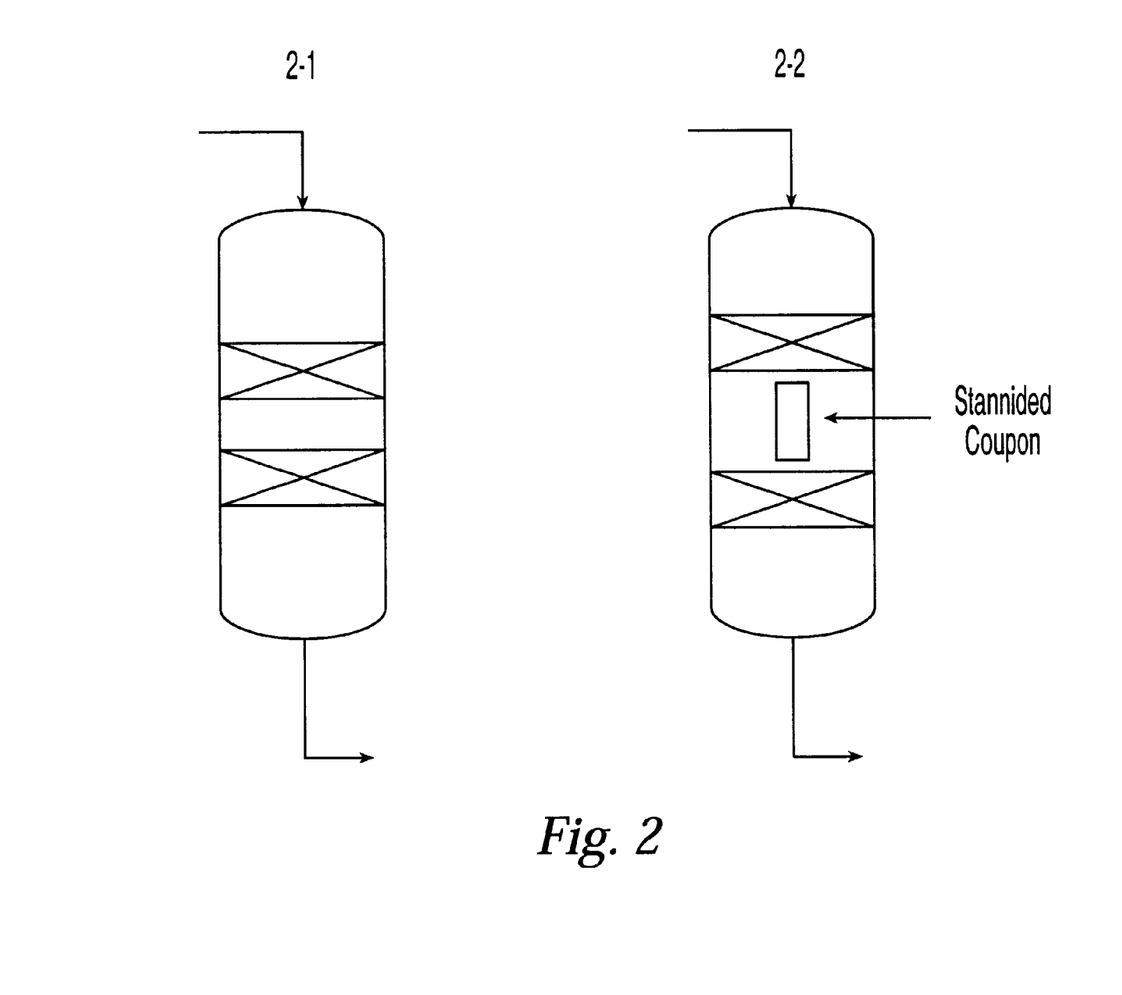
FIG. 2 shows experimental configurations for screening tests described in Examples 5 and 6.

A halided platinum L-zeolite catalyst was prepared in a manner similar to EP 498,182A1, Example 4. Experiments showed that this catalyst evolved HCl and HF when heated to 500° F. in the presence of hydrogen. FIG. 1 shows HCl evolution as a function of temperature. HF loss is also observed. Gastec tubes were used to measure HCl concentration. Gas rates were 1300 GHSV, once-through. Hydrogen was added at time=79 hours. This catalyst was used for all the activity tests described below and as a source HCl and HF in some of the following examples.

EXAMPLE 3

Stability of Stannided Coupon

A freshly-stannided coupon was prepared using the procedure described in Example 1. The coupon was weighed before stanniding. After stanniding the coupon had increased 86.5 mg in weight. This coupon was placed in a stainless steel pilot plant and was heated to 900° F. in a $H_2/N_2$ mixture. After about 80 hr, the coupon was weighed again. It had lost less than 1 mg of weight. This example shows that in the absence of a getter (such as HCl), reactive tin does not readily migrate.

EXAMPLE 4

Comparative

A freshly-stannided coupon was prepared using the procedure described in Example 1. The coupon was weighed before stanniding. After stanniding the coupon had increased 84.3 mg in weight. The stannided coupon was placed in a pilot plant and was heated to 1000° F. using $H_2/N_2$ mixture containing 1000 ppm HCl. After 7 hours the coupon had lost 40.3 mg of weight. Assuming for calculation purposes that all this weight loss was tin loss, 48% of the tin was removed after 7 hr. After 22 hr, 87% of the tin had been removed.

This treatment procedure was too harsh; it removed too much of the stannide layer. The combination of temperature and HCl concentration was too aggressive.

EXAMPLE 5

Reforming Screening Tests

The impact of tin on catalyst performance was assessed in pilot plant tests. Run 1 (144–181) was done in a type 316 stainless steel reactor that was not stannided. One hundred and thirty cc of catalyst, prepared per Example 2, was loaded upstream of another catalyst layer of 60 cc. The set up shown in FIG. 2-1 was used. The catalyst served as an HCl/HF source. A startup treatment of the catalyst was done. This startup included drying the catalyst in $H_2$ from room temperature to 500° F. for 79 hr; then heating the catalyst in a mixture of 10% $H_2$ in $N_2$ from 500 to 932° F. at a rate of 10° F./hr over a period of about 43 hr, and then maintaining the catalyst at about 932° F. for 24 hr. GHSV was maintained at 1300 $hr^{-1}$ for the drying and reduction periods. Thereafter, the entire reactor was cooled to room temperature.

The upper catalyst layer was removed under a nitrogen blanket. A catalyst performance test was done using the lower catalyst only. Test conditions were 100 psig, 1.6 LHSV, 3.0 $H_2$/hydrocarbon and a target yield of 46.5 wt % aromatics. The feed was a $C_6$–$C_8$ UDEX raffinate from a aromatics extraction unit.

Run 2 (144–182) was set up as shown in FIG. 2-2. Here, a freshly-stannided reactor and freshly-stannided type 347 stainless steel coupons were used. Because of the process configuration, the ratio of stannided surface area to total catalyst volume was equal to about 20 times that of commercial scale equipment. Eighty cc of catalyst prepared per Example 2 was loaded upstream of a stannided coupon prepared as in Example 1. Another catalyst layer of 80 cc was loaded downstream of the stannided coupons. Then the startup procedure of Run 1 was done. After cooling, the upper catalyst layer and the coupon were removed under a nitrogen blanket. A catalyst performance test (as in Run 1) was done using the lower catalyst only. After the performance test, the lower catalyst layer was analyzed and found to contain about 1,000 ppm tin.

After 1200 hours on stream, start-of-run (SOR) temperatures were determined for Runs 1 and 2 by extrapolating the line-out temperature needed to achieve the target aromatic yield back to time=0. SOR temperatures showed that the catalyst of Run 2 was about 10° F. less active than the catalyst of Run 1. It is believed that reactive tin had reacted with evolving halides, including HCl, from the first catalyst layer, producing movable tin. This movable tin had deactivated the catalyst in the second catalyst layer.

EXAMPLE 6

Catalyst Performance After Coupon Pre-treatment

Pretreatment conditions were developed from removing reactive tin from stannided coupons. A freshly-stannided coupon that had increased 77.5 mg in weight after stanniding was placed in a pilot plant. The coupon was heated to 900° F. using a $H_2/N_2$ mixture containing 100 ppm HCl. Movable tin was formed; it migrated downstream to the cooler portions of the pilot plant and plated out. The pilot plant was cooled at various time intervals so that the coupon could be weighed. It was then reheated to 900° F. After 7.5 hours, the coupon had lost 6.3% of the total tin (0.65 mg/hr); after 13.5 hr, 9.0% (0.35 mg/hr); after 28.5 hours, 13.4% of the tin (0.23 mg/hr); after 44.5 hr, 16.5% (0.15 mg/hr); after 60.3 hr, 18.8% (0.11 mg/hr). When these numbers were plotted (time versus wt % tin loss). The knee in the curve was observed at about 15 wt % tin loss.

The impact of a tin removal step prior to catalyst loading was assessed in a pilot plant test. Six stannided coupons were pretreated with 100 ppm HCl at 900° F. Based on the above experiments, it was decided to remove about 15 wt % of the tin by pretreatment. It was estimated that this would take 40 hours. After 40 hours only 6–10 wt % of the tin had been removed, so the coupons were heated again for an additional 20 hr. This process removed between 19–23 wt % of the added tin. These coupons were used in the following test, Run 4, below.

A separate pilot plant test, Run 3 (60–313), was set up as in FIG. 2-1 with 80 cc of halided Pt L-zeolite catalyst in each bed. As in Run 1, a start-up procedure was done. This was followed by a catalyst performance test using the lower catalyst only.

In run 4 (60–314), the set up of FIG. 2-2 was used with a uncoated 316 stainless steel reactor and with catalyst beds of 80 cc each. The six tin-pretreated coupons described above were placed between the catalyst beds. The stannided surface area/catalyst volume in the second bed was about two times the stannided surface area/catalyst volume of a coated commercial reforming reactor system. After following the startup procedures in Example 5, the coupons were weighed; they had lost an additional 2–4 wt % of tin. A catalyst performance test using the lower catalyst layer was done.

The catalyst performance in Run 4 was compared with Run 3. Performance test conditions were similar to those in Runs 1 and 2, except that after 500 hr, the severity was increased to 84 wt % aromatics. SOR temperatures showed that the catalyst of Run 3 had the same SOR temperature as the catalyst of Run 4. These results show that the reactive tin had been removed in the pretreatment process. The remaining stannide layer apparently did not react with evolving halides (HCl and/or HF) from the first catalyst bed, so catalyst deactivation was not observed in the second catalyst bed.

EXAMPLE 7

Multiple Startup Test

Multiple startup tests, using a fresh charge of catalyst each time, were done in a stainless steel reactor that was not stannided. A halided Pt L-zeolite catalyst (20 cc) was placed in the reactor and freshly-stannided coupons of type 347 steel were prepared as in Example 1 and cured at 1100° F. The weight gain associated with this stanniding was measured. This gain was assumed to be 100% tin. These coupons and an uncoated type 347 stainless steel coupon were placed downstream of the catalyst bed. The stannided coupons were weighed prior to testing. The catalyst and coupons were first dried in nitrogen at 1,300 GHSV. The catalyst was heated from room temperature to 500° F. at this flow rate. The coupons were kept at about 120° F. higher temperature than the catalyst during the heat treatment. This simulated furnace temperatures relative to catalyst temperatures under commercial condition.

Then hydrogen was introduced and the rate of nitrogen decreased, keeping the total flow rate constant. The rate of hydrogen was maintained at 10% of the total flow. The catalyst was activated by treatment with this hydrogen in nitrogen stream ($H_2/N_2=1/9$) while the catalyst was heated at a rate of 10° F./hr from 500° F. to 932° F. over a period of about 43 hours. Meanwhile, the coupons were heated at 10° F./hr from 600° F. to about 1050° F. Afterwards, the catalyst was maintained at about 932° F. and the coupons at about 1050° F. for 24 hr in the absence of feed.

The reactor was then allowed to cool to room temperature in nitrogen and opened. After removing the catalyst, the coupons were removed and weighed. The coupons were then placed back into the reactor along with a charge of fresh catalyst. The heating procedure was repeated for a second cycle. Additional cycles were done in the same manner.

Figure 3:
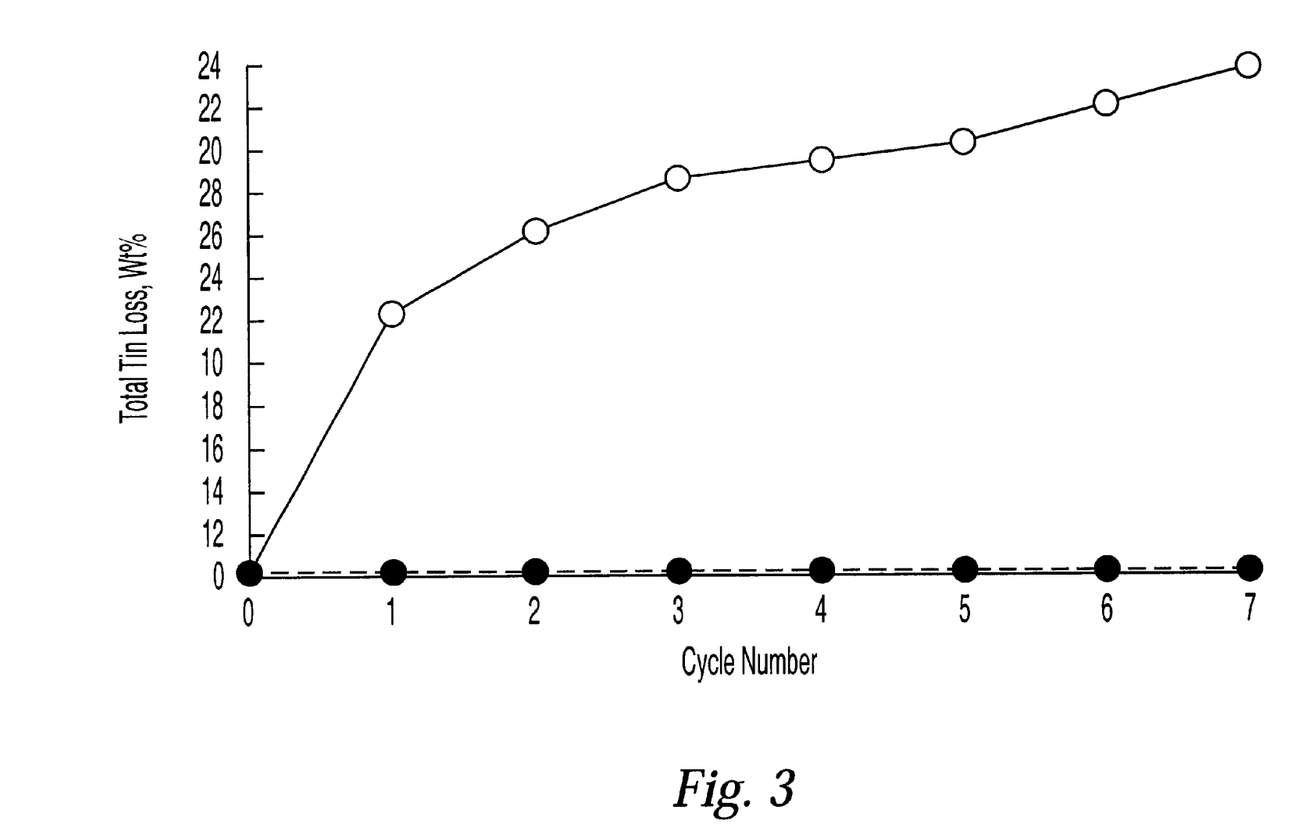
FIG. 3 shows total tin weight loss from a stannided coupon as a function of the number of startup cycles, each done in the presence of fresh halided Pt L-zeolite catalyst (open circles). The line at the bottom (closed circles) is a control. See Example 7.

FIG. 3 shows the results of this test. It shows the tin weight loss in the coupons (e.g., wt % tin loss compared to the total tin added above) as a function of the number of start-up cycles. The bare, uncoated coupon did not show any weight loss (closed circles). As can be seen, the initial metal (tin) loss for the stannided coupon (open circles) was high in the first cycle. In later cycles this weight loss decreased. Looking at FIG. 3, it can be seen that the original weight loss was 12 wt % of the initial tin in the first cycle, 4 wt % in the second cycle and 2 wt % in the third cycle. This third cycle weight loss is about 10% of the initial weight loss rate (2% vs. 12%) and would be an appropriate time to discontinue metal removal operations, as most of the reactive metal has been removed.

EXAMPLE 8

Calculations for Commercial Scale Operation

The tin loss per unit area of coupons was calculated using the weight loss data from Example 7. Based on the tin loss per unit area, the total tin loss expected in a commercial scale plant was calculated. It was assumed that the total surface area in the reactors, furnace tubes and associated piping would be covered by tin. Assuming all the lost tin deposits on the catalyst, the tin content of the catalyst and the catalyst performance impact in a commercial unit were estimated. The results are shown below:

Estimated Tin Content of Commercial Catalyst and Performance Impact

| Startup Cycle | Incremental Tin Deposit in Catalyst, ppm | Estimated Catalyst Activity Debit, °F. (1) |
|---|---|---|
| 1 | 800 | 8.0 |
| 2 | 250 | 2.5 |
| 3 | 150 | 1.5 |
| 4 | 50 | 0.5 |
| 5 | 50 | 0.5 |
| Total | 1300 | 13.0 |

(1) Assumes 10° F. activity debit from 1000 ppm tin deposit in catalyst

This 13° F. start-of-run activity loss will significantly decrease run length. Additionally impacts on catalyst stability could further shorten catalyst life.

EXAMPLE 9

A Large Scale Test

This example describes a large scale test and demonstrates a preferred embodiment of the invention.

A small, commercial scale, catalytic reformer is to be operated at ultra-low sulfur reforming conditions using a platinum L-zeolite catalyst with a $C_6$–$C_8$ UDEX raffinate feed. The sulfur content of the feed contacting the catalyst is less than 5 ppb sulfur. The reactor system includes a sulfur converter/sulfur sorber, followed by four reforming reactors, their associated furnaces and furnace tubes. The reactors are made of 1¼ Cr, ½ Mo steel. The furnace tubes are made of 304 stainless steel.

Prior to catalyst loading, the reactors, the furnace tubes and the associated piping of the reactor system are treated with a reducible tin paint. Several coupons are also placed in the reactor system. The paint is applied to the coupons and to all reactor system surfaces that are to contact hydrocarbon feed at reforming or higher temperatures. The paint consists of 1 part 20% Tin Ten-Cem (manufactured by Mooney Chemical Inc., Cleveland, Ohio), 2 parts powdered stannic oxide, 2 parts finely powdered tin metal (1–5 microns in size) and isopropyl alcohol (for flowability). The Tin Ten-Cem contains 20% tin as stannous octanoate in octanoic acid. After the paint is applied to a wet thickness of about 3 mils, the coated reactor system is heated in a mixture of flowing hydrogen and nitrogen (1/9 ratio) for about 24 hours and then is maintained at about 1050° F. for about 48 hours. It is then cooled to room temperature. This procedure results in the painted surfaces being stannided (with iron and nickel stannides). The tin migrates to cover small regions (e.g., welds) which are not painted. The reactors and furnace tubes are inspected, and any chunks of tin that that can be readily removed are removed. The coupons are analyzed by petrographic microscopy; they show the presence of shiny microscopic tin balls.

Reactive tin is removed from this freshly-stannided reactive system. A bed of calcium on alumina is placed at the bottom of the last reactor and prior the effluent heat exchanger. A getter mixture consisting of about 1 volume % perchloroethylene (PERC) in hydrogen is passed over a Pt on alumina catalyst at 900° F., to generate HCl in-situ. The resulting gas is diluted with nitrogen to produce a gas containing 100 ppm HCl which is passed into the freshly-stannided reactor system described above. The reactor system is heated to 600° F. over 6 hours and then held at 600° F. until the reactive tin is converted to a movable form, believed to be tin chloride. The time at 600° F. is determined by using a set of freshly-stannided removable coupons of known tin content. When the reactive tin has been converted to stannous chloride, PERC addition is terminated. This is done by placing the coupons in a vessel connected to the transfer piping located between the reactor and the furnace. Valves allow removal of the coupons for analysis. A coupon is removed every ten hours, washed with water, dried and weighted. Weight percent tin loss vs time is plotted. This graph is used to determine when sufficient reactive tin is reacted and thus when to stop adding getter. Additionally, as the process nears completion, analysis using petrographic and electron microscopy shows that the stannided surfaces of the coupons are substantially free of microscopy tin balls.

Thereafter, the reactor system is heated to 1000° F. in $H_2/N_2$ and then is held at 1000° F. for 24 hours. The volatile $SnCl_2$ is fixated by adsorption onto the alumina sorbent in the last reactor. After the alumina sorbent is removed, the catalysts are loaded into the reactors. The halided platinum L-zeolite catalyst of Example 2 is used to reform the raffinate feed to aromatics at temperatures between 800 and 1000° F.

The metals removal process is shown to be effective. The catalyst does not show any decline in activity as measured by SOR temperature compared to what is expected for this catalyst in a non-stannided reactor system.

While the invention has been described above in terms of preferred embodiments, it is to be understood that variations and modifications may be used as will be appreciated by those skilled in the art. Indeed, there are many variations and modifications to the above embodiments which will be readily evident to those skilled in the art, and which are to be considered within the scope of the invention as defined by the following claims.

We claim:

1. A method of removing reactive metal from a metal-coated hydrocarbon conversion reactor system, comprising:
contacting at least a portion of a metal-coated hydrocarbon coversion reactor system comprising a reactive metal with a getter to produce a movable metal;
removing said movable metal from the metal-coated hydrocarbon conversion reactor system; and
fixating said movable metal.

2. The method of claim 1 wherein said getter comprises or is derived from a gaseous halogen-containing compound.

3. The method of claim 2 wherein said gaseous halogen-containing compound is selected from the group consisting of organic halides, inorganics halides, a halided support material and hydrogen halides.

4. The method of claim 3 wherein said gaseous halogen-containing compound comprises HCl.

5. The method of claim 4 wherein said contacting step comprises the step of contacting at least a portion of the metal-coated hydrocarbon conversion reactor system comprising the reactive metal with HCl having a concentration between approximately 0.1 and 1000 ppm.

6. The method of claim 5 wherein said concentration is between approximately 1 and 500 ppm.

7. The method of claim 6 wherein said concentration is between approximately 10 and 200 ppm.

8. The method of claim 7 wherein the metal-coated hydrocarbon conversion reactor system comprises a metal coating comprising tin.

9. The method of claim 4 wherein said contacting step comprises the step of contacting at least a portion of the metal-coated hydrocarbon conversion reactor system comprising the reactor metal with HCl having a concentration sufficient to avoid undesirable removal of a portion of a protective layer of the metal-coated hydrocarbon conversion reactor system.

10. The method of claim 1 wherein said fixating step comprises the step of sorbing said movable metal.

11. The method of claim 10 wherein said sorbing step comprises the step of sorbing said movable metal with a liquid sorbent.

12. The method of claim 10 wherein said sorbing step comprises the step of sorbing said movable metal with a solid sorbent.

13. The method of claim 1 wherein the metal-coated hydrocarbon conversion reactor system comprises a metal coating comprising tin, germanium, antimony, or aluminum.

14. The method of claim 13 wherein the metal coating comprising metallic tin, tin compounds or tin alloys.

15. The method of claim 1 wherein said removing step and said fixating step are both performed by washing said movable metal from the metal-coated hydrocarbon conversion reactor system.

16. The method of claim 1 wherein said removing step is performed after said fixating step.

17. A method of removing reactive tin from at least a portion of hydrocarbon conversion reactor system having a freshly-stannided surface which comprises reactive tin, said method comprising the steps of:

contacting the reactive tin in a hydrocarbon conversion reactor system with a getter to produce movable tin;

removing said movable tin from the hydrocarbon conversion reactor system; and sorbing or reacting the movable tin with a sorbent.

18. The method of claim 17 wherein said getter comprises or is derived from a halogen-containing gas.

19. The method of claim 18 wherein said halogen-containing gas comprises HCl.

20. The method of claim 19 wherein said contacting step comprises the step of contacting the reactive tin with said HCl having a concentration between approximately 0.1 and 1000 ppm.

21. The method of claim 20 wherein said concentration is between approximately 1 and 500 ppm.

22. The method of claim 21 wherein said concentration is between approximately 10 and 200 ppm.

23. The method of claim 19 wherein said contacting step comprises the step of contacting the reactive tin with said HCl having a concentration sufficient to avoid undesirable removal of a portion of a protective layer of the metal-coated hydrocarbon conversion reactor system.

24. The method of claim 17 wherein said sorption or reaction step is performed upstream of a catalyst bed, and said contacting step comprises the step of adding said getter downstream of the catalyst bed.

25. The method of claim 17 in which said reactor system comprises a plurality of reactors and optionally a feed effluent heat exchanger, and wherein the sorbent is disposed within the last reactor of said plurality of reactors or upstream of the feed effluent heat exchanger.

26. The method of claim 17 wherein said removing step and said sorbing or reacting step are both performed by washing said movable tin from the hydrocarbon conversion reactor system.

27. The method of claim 17 wherein said removing step is performed after said sorbing or reacting step.

28. The method of claim 17 wherein said sorbing or reacting step comprises the step of sorbing said movable tin with a liquid sorbent.

29. A method of removing reactive metal from a metal-coated reforming reactor system, comprising the step of:

contacting a metal-coated reforming reactor system comprising a reactive metal with a getter comprising a hydrogen halide to produce a movable metal;

removing said movable metal from the metal-coated reforming reactor system; and sorbing said movable metal on a sorbent.

30. The method of claim 29 wherein the sorbent comprises alumina.

31. The method of claim 29 wherein the reactive metal is tin.

32. The method of claim 31 wherein said contacting step comprises the step of contacting the metal-coating reforming reactor system comprising tin with said getter comprising HCl having a concentration between approximately 0.1 and 1000 ppm.

33. The method of claim 32 wherein said concentration is between approximately 1 and 500 ppm.

34. The method of claim 33 wherein said concentration is between approximately 10 and 200 ppm.

35. The method of claim 31 wherein said contacting step comprises the step of contacting the metal-coated reforming reactor system comprising said tin with said getter comprising HCl having a concentration sufficient to avoid undesirable removal of a portion of a protective layer of the metal-coated reforming system.

36. The method of claim 29 wherein said getter comprises a gaseous stream comprising HCl and hydrogen.

37. The method of claim 36 in which the gaseous HCl and hydrogen are produced by reacting a halogen-containing compound with hydrogen over a platinum or nickel catalyst.

38. The method of claim 29 wherein said removing step and said sorbing step are both performed by washing said movable metal from the metal-coated reforming reactor system.

39. The method of claim 29 wherein said removing step is performed after said sorbing step.

40. The method of claim 29 wherein said sorbing step comprises the step of sorbing said movable with a liquid sorbent.

* * * * *